US011680116B2

(12) United States Patent
Hopkins et al.

(10) Patent No.: US 11,680,116 B2
(45) Date of Patent: Jun. 20, 2023

(54) POLYMERIC ANTIMICROBIAL SURFACTANT

(71) Applicant: Poly Group LLC, New Albany, IN (US)

(72) Inventors: Thomas E. Hopkins, Goshen, KY (US); Craig A. Kalmer, Louisville, KY (US)

(73) Assignee: Poly Group LLC, New Albany, IN (US)

( * ) Notice: Subject to any disclaimer, the term of this patent is extended or adjusted under 35 U.S.C. 154(b) by 287 days.

(21) Appl. No.: 16/993,761

(22) Filed: Aug. 14, 2020

(65) Prior Publication Data

US 2020/0369800 A1  Nov. 26, 2020

Related U.S. Application Data

(63) Continuation of application No. 16/011,579, filed on Jun. 18, 2018, now abandoned.

(60) Provisional application No. 62/521,313, filed on Jun. 16, 2017.

(51) Int. Cl.
| | |
|---|---|
| *C08L 39/08* | (2006.01) |
| *C08L 33/14* | (2006.01) |
| *C08F 226/06* | (2006.01) |
| *C08F 220/28* | (2006.01) |
| *C09D 5/02* | (2006.01) |
| *C08F 26/06* | (2006.01) |
| *C09D 5/14* | (2006.01) |
| *A01N 43/40* | (2006.01) |
| *C08F 226/10* | (2006.01) |
| *C08F 8/02* | (2006.01) |
| *C11D 3/37* | (2006.01) |
| *C11D 1/38* | (2006.01) |
| *C11D 3/48* | (2006.01) |
| *C08F 290/06* | (2006.01) |
| *C08F 8/44* | (2006.01) |
| *C09K 23/16* | (2022.01) |

(52) U.S. Cl.
CPC ............. *C08F 26/06* (2013.01); *A01N 43/40* (2013.01); *C08F 8/02* (2013.01); *C08F 8/44* (2013.01); *C08F 226/06* (2013.01); *C08F 226/10* (2013.01); *C08F 290/062* (2013.01); *C09D 5/027* (2013.01); *C09D 5/14* (2013.01); *C09K 23/16* (2022.01); *C11D 1/38* (2013.01); *C11D 3/3776* (2013.01); *C11D 3/48* (2013.01); *C08F 2800/10* (2013.01); *C08F 2810/50* (2013.01); *C09D 5/025* (2013.01)

(58) Field of Classification Search
None
See application file for complete search history.

(56) References Cited

U.S. PATENT DOCUMENTS

| | | |
|---|---|---|
| 2,717,887 A | 9/1955 | Saner |
| 2,732,350 A | 1/1956 | Clarke |
| 2,882,157 A | 4/1959 | Thompson et al. |
| 2,972,535 A | 2/1961 | Laakso et al. |
| 3,140,227 A | 7/1964 | Roth et al. |
| 3,227,672 A | 1/1966 | Fertig et al. |
| 3,262,807 A | 7/1966 | Sterman et al. |
| 3,296,167 A | 1/1967 | Turner et al. |
| 3,296,196 A | 1/1967 | Lamoreaux |
| 3,328,328 A | 6/1967 | Scanley |
| 3,450,794 A | 6/1969 | Ebneth et al. |
| 3,592,805 A | 7/1971 | Szabo et al. |
| 3,597,313 A | 8/1971 | Coscia et al. |
| 3,619,200 A | 11/1971 | Ferguson et al. |
| 3,753,716 A | 8/1973 | Ishihara et al. |
| 3,871,376 A | 3/1975 | Kozak |
| 3,872,128 A | 3/1975 | Byck |
| 3,898,188 A | 8/1975 | Rembaum et al. |
| 3,929,741 A | 12/1975 | Laskey |
| 3,975,350 A | 8/1976 | Hudgin et al. |
| 4,011,178 A | 3/1977 | Muse |

(Continued)

FOREIGN PATENT DOCUMENTS

| | | |
|---|---|---|
| DE | 3339662 A1 | 5/1984 |
| DE | 19833062 A1 | 2/2000 |

(Continued)

OTHER PUBLICATIONS

U.S. Appl. No. 11/509,915 Office Action dated Mar. 9, 2010.
U.S. Appl. No. 11/509,915 Amendment dated Aug. 9, 2010.
U.S. Appl. No. 11/509,915 Office Action dated May 12, 2011.
U.S. Appl. No. 11/509,915 Amendment dated Sep. 12, 2011.
U.S. Appl. No. 11/509,915 Advisory Action dated Sep. 29, 2011.
U.S. Appl. No. 11/509,915 Request for Continued Examination dated Oct. 11, 2011.
U.S. Appl. No. 12/549,004 Office Action dated May 4, 2012.
U.S. Appl. No. 12/549,004 Interview Summary dated Aug. 23, 2012.

(Continued)

*Primary Examiner* — Vu A Nguyen
(74) *Attorney, Agent, or Firm* — Strategic Innovation IP Law Offices, P.C.

(57) ABSTRACT

Polycationic polymeric antimicrobial surfactant and polymeric biocompatible antimicrobial surfactant compositions are useful in dispersing various compounds in a carrier liquid. The polycationic polymeric antimicrobial surfactant and polymeric biocompatible antimicrobial surfactant compositions employ polymers having both hydrophilic domains and hydrophobic domains so that the compositions can disperse particles such as polymer particles or droplets in a continuous phase as well as provide stable dispersions that have not been provided before. The antimicrobial properties of the compositions provide much-needed capabilities of fighting infectious agents such as bacteria and viruses in a wide spectrum of products such as paint, adhesives, and coatings. Methods of using these compositions as well as methods of making products using the compositions are disclosed.

22 Claims, No Drawings

(56) References Cited

U.S. PATENT DOCUMENTS

| | | |
|---|---|---|
| 4,017,440 A | 4/1977 | Killam |
| 4,026,941 A | 5/1977 | Login et al. |
| 4,029,694 A | 6/1977 | Weipert et al. |
| 4,069,365 A | 1/1978 | Rembaum |
| 4,070,189 A | 1/1978 | Kelley et al. |
| 4,080,315 A | 3/1978 | Login |
| 4,081,419 A | 3/1978 | Shimizu et al. |
| 4,093,676 A | 6/1978 | Weipert et al. |
| 4,098,842 A | 7/1978 | Login |
| 4,104,443 A | 8/1978 | Latta et al. |
| 4,119,094 A | 10/1978 | Micklus et al. |
| 4,125,110 A | 11/1978 | Hymes |
| 4,147,550 A | 4/1979 | Campbell et al. |
| 4,152,307 A | 5/1979 | Shibahara et al. |
| 4,181,752 A | 1/1980 | Martens et al. |
| 4,191,743 A | 3/1980 | Klemm et al. |
| 4,226,232 A | 10/1980 | Spence |
| 4,226,748 A | 10/1980 | Matsunaga et al. |
| 4,229,554 A | 10/1980 | Newkirk et al. |
| 4,234,381 A | 11/1980 | Killam |
| 4,256,800 A | 3/1981 | Stockhausen et al. |
| 4,259,411 A | 3/1981 | Windhager et al. |
| 4,304,703 A | 12/1981 | Das |
| 4,306,996 A | 12/1981 | Windhager |
| 4,318,947 A | 3/1982 | Joung |
| 4,332,919 A | 6/1982 | Kobayashi et al. |
| 4,361,623 A | 11/1982 | Newkirk et al. |
| 4,366,238 A | 12/1982 | Yokoyama et al. |
| 4,373,009 A | 2/1983 | Winn |
| 4,377,667 A | 3/1983 | Sakurai et al. |
| 4,384,078 A | 5/1983 | Ohya et al. |
| 4,391,278 A | 7/1983 | Cahalan et al. |
| 4,393,048 A | 7/1983 | Mason, Jr. et al. |
| 4,414,353 A | 11/1983 | Maslanka et al. |
| 4,416,668 A | 11/1983 | Thompson |
| RE31,454 E | 12/1983 | Hymes |
| 4,459,289 A | 7/1984 | Maltz |
| 4,480,075 A | 10/1984 | Willis |
| 4,482,680 A | 11/1984 | Sheldon et al. |
| 4,500,517 A | 2/1985 | Luss |
| 4,506,070 A | 3/1985 | Ben |
| 4,515,162 A | 5/1985 | Yamamoto et al. |
| 4,515,593 A | 5/1985 | Norton |
| 4,539,996 A | 9/1985 | Engel |
| 4,543,390 A | 9/1985 | Tanaka et al. |
| 4,546,140 A | 10/1985 | Shih |
| 4,563,184 A | 1/1986 | Korol |
| 4,570,629 A | 2/1986 | Widra |
| 4,581,821 A | 4/1986 | Cahalan et al. |
| 4,617,343 A | 10/1986 | Walker et al. |
| 4,632,881 A | 12/1986 | Trotz et al. |
| 4,657,006 A | 4/1987 | Rawlings et al. |
| 4,659,785 A | 4/1987 | Nagano et al. |
| 4,668,748 A | 5/1987 | Hardam et al. |
| 4,674,512 A | 6/1987 | Rolf |
| 4,699,146 A | 10/1987 | Sieverding |
| 4,705,709 A | 11/1987 | Vailancourt |
| 4,722,965 A | 2/1988 | Wong et al. |
| 4,728,323 A | 3/1988 | Matson |
| 4,735,991 A | 4/1988 | Guioth et al. |
| 4,740,546 A | 4/1988 | Masuda et al. |
| 4,762,862 A | 8/1988 | Yada et al. |
| 4,768,523 A | 9/1988 | Cahalan et al. |
| 4,769,013 A | 9/1988 | Lorenz et al. |
| 4,777,954 A | 10/1988 | Keusch et al. |
| 4,791,063 A | 12/1988 | Hou et al. |
| 4,810,567 A | 3/1989 | Calcaterra et al. |
| 4,816,508 A | 3/1989 | Chen |
| 4,831,098 A | 5/1989 | Watanabe et al. |
| 4,841,021 A | 6/1989 | Katritzky et al. |
| 4,842,768 A | 6/1989 | Nakao et al. |
| 4,848,353 A | 7/1989 | Engel |
| 4,857,585 A | 8/1989 | Leising |
| 4,857,590 A | 8/1989 | Gaggar et al. |
| 4,859,727 A | 8/1989 | Sasaki et al. |
| 4,876,278 A | 10/1989 | Taylor et al. |
| 4,877,687 A | 10/1989 | Azegami et al. |
| 4,891,306 A | 1/1990 | Yokoyama et al. |
| 4,898,908 A | 2/1990 | Lahalih et al. |
| 4,900,543 A | 2/1990 | Ritter et al. |
| 4,900,544 A | 2/1990 | Ritter et al. |
| 4,920,166 A | 4/1990 | Buysch et al. |
| 4,931,506 A | 6/1990 | Yu |
| 4,931,522 A | 6/1990 | Catena |
| 4,943,612 A | 7/1990 | Morita et al. |
| 4,947,847 A | 8/1990 | Nakao et al. |
| 4,948,720 A | 8/1990 | Chen et al. |
| 4,954,636 A | 9/1990 | Merianos et al. |
| 4,957,908 A | 9/1990 | Nelson |
| 4,981,936 A | 1/1991 | Good et al. |
| 4,997,697 A | 3/1991 | Malhotra |
| 4,999,249 A | 3/1991 | Deschler et al. |
| 5,004,760 A | 4/1991 | Patton et al. |
| 5,006,267 A | 4/1991 | Vaughn et al. |
| 5,010,139 A | 4/1991 | Yu |
| 5,019,096 A | 5/1991 | Fox, Jr. et al. |
| 5,024,840 A | 6/1991 | Blakely et al. |
| 5,043,195 A | 8/1991 | Skrivseth |
| 5,049,383 A | 9/1991 | Huth et al. |
| 5,055,171 A | 10/1991 | Peck |
| 5,057,560 A | 10/1991 | Mueller |
| 5,059,629 A | 10/1991 | Patton et al. |
| 5,061,752 A | 10/1991 | Buysch et al. |
| 5,069,907 A | 12/1991 | Mixon et al. |
| 5,080,097 A | 1/1992 | Eisenberg |
| 5,081,182 A | 1/1992 | Robinson et al. |
| 5,082,697 A | 1/1992 | Patton et al. |
| 5,124,076 A | 6/1992 | Smuckler |
| 5,142,010 A | 8/1992 | Olstein |
| 5,153,321 A | 10/1992 | Finter et al. |
| 5,175,059 A | 12/1992 | Yamamoto et al. |
| 5,183,576 A | 2/1993 | Wood et al. |
| 5,194,539 A | 3/1993 | Charmot et al. |
| 5,205,297 A | 4/1993 | Montecalvo et al. |
| 5,247,008 A | 9/1993 | Michels et al. |
| 5,255,979 A | 10/1993 | Ferrari |
| 5,263,481 A | 11/1993 | Axelgaard |
| 5,264,249 A | 11/1993 | Perrault et al. |
| 5,269,770 A | 12/1993 | Conway et al. |
| 5,271,943 A | 12/1993 | Bogart et al. |
| 5,290,894 A | 3/1994 | Melrose et al. |
| 5,312,863 A | 5/1994 | Van Rheenen et al. |
| 5,314,924 A | 5/1994 | Lee |
| 5,317,063 A | 5/1994 | Komatsu et al. |
| 5,330,527 A | 7/1994 | Montecalvo et al. |
| 5,336,717 A | 8/1994 | Rolando et al. |
| 5,346,956 A | 9/1994 | Gnanou |
| 5,354,790 A | 10/1994 | Keusch et al. |
| 5,358,688 A | 10/1994 | Robertson |
| 5,369,179 A | 11/1994 | Havens |
| 5,370,981 A | 12/1994 | Krafft et al. |
| 5,402,884 A | 4/1995 | Gilman et al. |
| 5,403,587 A | 4/1995 | McCue et al. |
| 5,403,640 A | 4/1995 | Krishnan et al. |
| 5,403,883 A | 4/1995 | Messner et al. |
| 5,420,197 A | 5/1995 | Lorenz et al. |
| 5,421,982 A | 6/1995 | Ikeda et al. |
| 5,429,590 A | 7/1995 | Saito et al. |
| 5,432,000 A | 7/1995 | Young, Sr. et al. |
| 5,447,643 A | 9/1995 | Kelkenberg et al. |
| 5,466,256 A | 11/1995 | McAdams et al. |
| 5,470,916 A | 11/1995 | Righetti et al. |
| 5,474,065 A | 12/1995 | Meathrel et al. |
| 5,480,717 A | 1/1996 | Kundel |
| 5,489,437 A | 2/1996 | Marra |
| 5,494,987 A | 2/1996 | Imazato et al. |
| 5,498,478 A | 3/1996 | Hansen et al. |
| 5,509,899 A | 4/1996 | Fan et al. |
| 5,512,329 A | 4/1996 | Guire et al. |
| 5,515,117 A | 5/1996 | Dziabo et al. |
| 5,518,788 A | 5/1996 | Invie |
| 5,520,180 A | 5/1996 | Uy et al. |
| 5,520,910 A | 5/1996 | Hashimoto et al. |
| 5,525,356 A | 6/1996 | Jevne et al. |

(56) References Cited

U.S. PATENT DOCUMENTS

| | | |
|---|---|---|
| 5,533,971 A | 7/1996 | Phipps |
| 5,536,446 A | 7/1996 | Uy et al. |
| 5,536,494 A | 7/1996 | Park |
| 5,536,861 A | 7/1996 | Robertson |
| 5,563,056 A | 10/1996 | Swan et al. |
| 5,591,799 A | 1/1997 | Bott et al. |
| 5,597,661 A | 1/1997 | Takeuchi et al. |
| 5,599,321 A | 2/1997 | Conway et al. |
| 5,608,021 A | 3/1997 | Uchiyama et al. |
| 5,614,538 A | 3/1997 | Nelson, Jr. |
| 5,614,586 A | 3/1997 | Tang et al. |
| 5,618,586 A | 4/1997 | Swarup et al. |
| 5,622,168 A | 4/1997 | Keusch et al. |
| 5,624,704 A | 4/1997 | Darouiche et al. |
| 5,645,968 A | 7/1997 | Sacripante et al. |
| 5,646,197 A | 7/1997 | Martin |
| 5,654,369 A | 8/1997 | Tsubaki et al. |
| 5,665,477 A | 9/1997 | Meathrel et al. |
| 5,667,913 A | 9/1997 | Chen et al. |
| 5,670,557 A | 9/1997 | Dietz et al. |
| 5,674,275 A | 10/1997 | Tang et al. |
| 5,674,561 A | 10/1997 | Dietz et al. |
| 5,688,855 A | 11/1997 | Stoy et al. |
| 5,700,742 A | 12/1997 | Payne |
| 5,725,789 A | 3/1998 | Huber et al. |
| 5,773,507 A | 6/1998 | Incorvia et al. |
| 5,779,632 A | 7/1998 | Dietz et al. |
| 5,798,048 A | 8/1998 | Ries |
| 5,798,096 A | 8/1998 | Pavlyk |
| 5,800,685 A | 9/1998 | Perrault |
| 5,821,280 A | 10/1998 | Suda et al. |
| 5,830,934 A | 11/1998 | Krishnan |
| 5,830,983 A | 11/1998 | Alex et al. |
| 5,834,561 A | 11/1998 | Fukumoto et al. |
| 5,849,045 A | 12/1998 | Chen et al. |
| 5,849,822 A | 12/1998 | Kido et al. |
| 5,874,184 A | 2/1999 | Takeuchi et al. |
| 5,886,098 A | 3/1999 | Ueda et al. |
| 5,907,017 A | 5/1999 | Ober et al. |
| 5,916,917 A | 6/1999 | Suh et al. |
| 5,967,714 A | 10/1999 | Ottersbach et al. |
| 5,984,102 A | 11/1999 | Tay |
| 5,985,990 A | 11/1999 | Kantner et al. |
| 5,997,815 A | 12/1999 | Anders et al. |
| 6,013,275 A | 1/2000 | Konagaya et al. |
| 6,015,836 A | 1/2000 | Martin |
| 6,022,553 A | 2/2000 | Anders et al. |
| 6,024,895 A | 2/2000 | Shimizu et al. |
| 6,038,464 A | 3/2000 | Axelgaard et al. |
| 6,039,940 A | 3/2000 | Perrault et al. |
| 6,045,919 A | 4/2000 | Alex et al. |
| 6,050,979 A | 4/2000 | Haemmerle et al. |
| 6,090,459 A | 7/2000 | Jadamus et al. |
| 6,096,800 A | 8/2000 | Ottersbach et al. |
| 6,103,368 A | 8/2000 | Fukuda et al. |
| 6,114,467 A | 9/2000 | Ober et al. |
| 6,127,105 A | 10/2000 | Vandenabeele |
| 6,187,856 B1 | 2/2001 | Incorvia et al. |
| 6,194,530 B1 | 2/2001 | Klesse et al. |
| 6,197,322 B1 | 3/2001 | Dutkiewicz et al. |
| 6,203,856 B1 | 3/2001 | Ottersbach et al. |
| 6,207,361 B1 | 3/2001 | Greener et al. |
| 6,218,492 B1 | 4/2001 | Hill et al. |
| 6,221,425 B1 | 4/2001 | Michal et al. |
| 6,242,526 B1 | 6/2001 | Siddiqui et al. |
| 6,248,811 B1 | 6/2001 | Ottersbach et al. |
| 6,251,967 B1 | 6/2001 | Perichaud et al. |
| 6,266,490 B1 | 7/2001 | Mukai et al. |
| 6,280,509 B1 | 8/2001 | Mallow |
| 6,319,883 B1 | 11/2001 | Graham et al. |
| 6,358,557 B1 | 3/2002 | Wang et al. |
| 6,368,587 B1 | 4/2002 | Anders et al. |
| 6,410,040 B1 | 6/2002 | Melrose et al. |
| 6,428,866 B1 | 8/2002 | Jadamus et al. |
| 6,482,781 B2 | 11/2002 | Graham et al. |
| 6,497,868 B1 | 12/2002 | Tanahashi |
| 6,500,981 B1 | 12/2002 | Weipert |
| 6,511,669 B1 | 1/2003 | Garnier et al. |
| 6,525,134 B1 | 2/2003 | Lacroix et al. |
| 6,537,663 B1 | 3/2003 | Chang et al. |
| 6,559,116 B1 | 5/2003 | Godfroid et al. |
| 6,583,228 B2 | 6/2003 | Nkansah et al. |
| 6,689,856 B2 | 2/2004 | L'alloret |
| 6,750,296 B2 | 6/2004 | Ober et al. |
| 6,767,647 B2 | 7/2004 | Swofford et al. |
| 6,797,743 B2 | 9/2004 | McDonald |
| 6,800,278 B1 | 10/2004 | Perrault et al. |
| 6,815,074 B2 | 11/2004 | Aguado et al. |
| 6,815,502 B1 | 11/2004 | Lang et al. |
| 6,821,943 B2 | 11/2004 | Avery et al. |
| 6,852,353 B2 | 2/2005 | Qiu et al. |
| 7,112,559 B1 | 9/2006 | Mayhall et al. |
| 8,343,473 B2 * | 1/2013 | Youngblood ............ C12Q 1/18 |
| | | 424/78.3 |
| 8,349,300 B2 | 1/2013 | Wells et al. |
| 9,131,683 B2 | 9/2015 | Gisser et al. |
| 9,289,378 B2 | 3/2016 | Karandikar et al. |
| 11,134,684 B2 | 10/2021 | Youngblood et al. |
| 11,421,084 B2 | 8/2022 | Hopkins et al. |
| 11,459,415 B2 | 10/2022 | Youngblood et al. |
| 2001/0007694 A1 | 7/2001 | Ottersbach et al. |
| 2001/0044482 A1 | 11/2001 | Hu et al. |
| 2001/0050478 A1 | 12/2001 | Schmitz |
| 2002/0037955 A1 | 3/2002 | Baumann et al. |
| 2002/0081923 A1 | 6/2002 | Artley et al. |
| 2002/0086160 A1 | 7/2002 | Qiu et al. |
| 2002/0139583 A1 | 10/2002 | Masui et al. |
| 2002/0168473 A1 | 11/2002 | Ottersbach et al. |
| 2002/0177828 A1 | 11/2002 | Batich et al. |
| 2003/0013624 A1 | 1/2003 | Graham et al. |
| 2003/0017194 A1 | 1/2003 | Joerger et al. |
| 2003/0019813 A1 | 1/2003 | Ottersbach et al. |
| 2003/0022576 A1 | 1/2003 | Ottersbach et al. |
| 2003/0049437 A1 | 3/2003 | Devaney et al. |
| 2003/0068440 A1 | 4/2003 | Ottersbach et al. |
| 2003/0091641 A1 | 5/2003 | Tiller et al. |
| 2003/0108507 A1 | 6/2003 | Clipson et al. |
| 2003/0161804 A1 | 8/2003 | Perron et al. |
| 2003/0229185 A1 | 12/2003 | Chen et al. |
| 2003/0236376 A1 | 12/2003 | Kindt-Larsen et al. |
| 2004/0009136 A1 | 1/2004 | Dubief et al. |
| 2004/0052746 A1 * | 3/2004 | Tamareselvy ........ A61K 8/8158 |
| | | 526/303.1 |
| 2004/0135967 A1 | 7/2004 | Carney et al. |
| 2004/0202639 A1 | 10/2004 | DeGrado et al. |
| 2005/0003163 A1 | 1/2005 | Krishnan |
| 2005/0008676 A1 | 1/2005 | Qiu et al. |
| 2005/0008839 A1 | 1/2005 | Cramer et al. |
| 2005/0013842 A1 | 1/2005 | Qiu et al. |
| 2005/0032931 A1 | 2/2005 | Naisby et al. |
| 2005/0053569 A1 | 3/2005 | Bavouzet |
| 2005/0058844 A1 | 3/2005 | Rubner et al. |
| 2005/0065284 A1 | 3/2005 | Krishnan |
| 2005/0101740 A1 | 5/2005 | Mougin |
| 2006/0057209 A1 | 3/2006 | Chapman et al. |
| 2006/0083854 A1 | 4/2006 | Ober et al. |
| 2006/0189710 A1 | 8/2006 | Hayashi et al. |
| 2007/0048249 A1 | 3/2007 | Youngblood et al. |
| 2007/0053867 A1 | 3/2007 | Ober et al. |
| 2007/0106040 A1 | 5/2007 | Ober et al. |
| 2007/0149694 A1 * | 6/2007 | Krishnan ............... A01N 37/44 |
| | | 524/543 |
| 2008/0226584 A1 | 9/2008 | Krishnan |
| 2009/0081367 A1 | 3/2009 | Makuta et al. |
| 2009/0311302 A1 | 12/2009 | Youngblood et al. |
| 2012/0046378 A1 | 2/2012 | Sloan |
| 2013/0079481 A1 | 3/2013 | Youngblood et al. |
| 2013/0109794 A1 | 5/2013 | Polzin et al. |
| 2013/0115185 A1 | 5/2013 | Tamareselvy et al. |
| 2013/0136783 A1 | 5/2013 | Youngblood et al. |
| 2014/0080977 A1 | 3/2014 | Youngblood et al. |
| 2014/0127320 A1 | 5/2014 | Salamone et al. |
| 2015/0093424 A1 | 4/2015 | Lapitsky et al. |
| 2016/0053038 A1 | 2/2016 | Youngblood et al. |

(56) References Cited

U.S. PATENT DOCUMENTS

| | | |
|---|---|---|
| 2016/0262392 A1 | 9/2016 | Youngblood et al. |
| 2017/0043197 A1 | 2/2017 | Olsen et al. |
| 2017/0360688 A1 | 12/2017 | Fevola et al. |
| 2018/0237686 A1 | 8/2018 | Schnoor et al. |
| 2018/0340046 A1 | 11/2018 | Hopkins et al. |
| 2018/0362678 A1 | 12/2018 | Hopkins et al. |
| 2020/0354527 A1 | 11/2020 | Hopkins et al. |
| 2021/0084898 A1 | 3/2021 | Youngblood et al. |
| 2022/0356309 A1 | 11/2022 | Hopkins et al. |
| 2022/0363841 A1 | 11/2022 | Hopkins et al. |

FOREIGN PATENT DOCUMENTS

| | | |
|---|---|---|
| DE | 19910811 | 9/2000 |
| EP | 0000426 A1 | 1/1979 |
| EP | 0085327 A1 | 8/1983 |
| EP | 0099209 | 1/1984 |
| EP | 0141628 A1 | 5/1985 |
| EP | 0239213 A2 | 9/1987 |
| EP | 0286009 A2 | 10/1988 |
| EP | 0337474 | 10/1989 |
| EP | 375350 A2 | 6/1990 |
| EP | 0204312 B1 | 8/1990 |
| EP | 0469196 A1 | 2/1992 |
| EP | 0604369 A1 | 6/1994 |
| EP | 0290676 B1 | 8/1994 |
| EP | 0747456 A2 | 12/1996 |
| EP | 1109845 B1 | 10/2005 |
| GB | 1299012 | 12/1972 |
| GB | 1350400 A | 4/1974 |
| GB | 2091277 A | 7/1982 |
| JP | H05286811 | 11/1993 |
| JP | 2002-105152 | 4/2002 |
| WO | WO 91/12282 | 8/1991 |
| WO | WO 92/06694 | 4/1992 |
| WO | WO 95/27530 | 10/1995 |
| WO | WO 97/14448 | 4/1997 |
| WO | WO 97/15603 | 5/1997 |
| WO | WO97/35542 | 10/1997 |
| WO | WO 97/45468 | 12/1997 |
| WO | WO 98/19311 | 5/1998 |
| WO | WO 98/29463 | 7/1998 |
| WO | WO 98/51720 | 11/1998 |
| WO | WO 99/09837 | 3/1999 |
| WO | WO 00/05283 | 2/2000 |
| WO | WO 00/08077 | 2/2000 |
| WO | WO 00/71591 A1 | 11/2000 |
| WO | WO03/028767 A2 | 4/2003 |
| WO | WO2004/045755 A2 | 6/2004 |
| WO | WO2013/185058 A2 | 12/2013 |
| WO | WO2016/127387 A1 | 8/2016 |
| WO | WO2017/003923 A1 | 1/2017 |
| WO | WO2018/222622 A1 | 12/2018 |
| WO | WO2018/232417 A1 | 12/2018 |

OTHER PUBLICATIONS

U.S. Appl. No. 12/549,004 Interview Summary dated Sep. 11, 2012.
U.S. Appl. No. 12/549,004 Amendment dated Sep. 13, 2012.
U.S. Appl. No. 12/549,004 Notice of Allowance dated Nov. 19, 2012.
U.S. Appl. No. 13/682,159 Office Action dated Mar. 1, 2013.
U.S. Appl. No. 11/509,915 Office Action dated Jun. 13, 2013.
U.S. Appl. No. 13/682,159 Amendment dated Jun. 28, 2013.
U.S. Appl. No. 13/682,159 Office Action dated Aug. 20, 2013.
U.S. Appl. No. 13/748,290 Office Action dated Aug. 22, 2013.
U.S. Appl. No. 11/509,915 Amendment dated Nov. 13, 2013.
U.S. Appl. No. 11/509,915 Office Action dated Jan. 7, 2014.
U.S. Appl. No. 14/087,188 Office Action dated Mar. 7, 2014.
U.S. Appl. No. 14/087,188 Response dated Sep. 8, 2014.
U.S. Appl. No. 14/087,188 Office Action dated Nov. 6, 2014.
U.S. Appl. No. 11/509,915 Amendment dated Dec. 8, 2014.
U.S. Appl. No. 11/509,915 Office Action dated Feb. 26, 2015.
U.S. Appl. No. 14/087,188 Pre-Appeal Conference Request dated May 6, 2015.
U.S. Appl. No. 14/837,900 Office Action dated Jan. 25, 2016.
U.S. Appl. No. 14/837,900 Amendment dated Apr. 21, 2016.
U.S. Appl. No. 14/837,900 Office Action dated Jun. 8, 2016.
U.S. Appl. No. 15/163,285 Office Action dated Nov. 21, 2016.
U.S. Appl. No. 14/837,900 Notice of Appeal dated Dec. 8, 2016.
U.S. Appl. No. 15/163,285 Amendment dated Mar. 21, 2017.
U.S. Appl. No. 15/163,285 Office Action dated May 9, 2017.
U.S. Appl. No. 15/163,285 Amendment dated Feb. 9, 2018.
U.S. Appl. No. 15/163,285 Office Action dated May 15, 2018.
U.S. Appl. No. 15/163,285 Amendment dated Aug. 15, 2018.
U.S. Appl. No. 15/163,285 Office Action dated Oct. 19, 2018.
U.S. Appl. No. 15/163,285 Notice of Appeal dated Jan. 22, 2019.
U.S. Appl. No. 15/163,285 Appeal Brief dated Jun. 20, 2019.
U.S. Appl. No. 15/163,285 Examiners Answer dated Aug. 14, 2019.
U.S. Appl. No. 15/163,285 Reply Brief dated Oct. 14, 2019.
U.S. Appl. No. 15/992,033 Office Action dated Jan. 24, 2020.
U.S. Appl. No. 16/011,579 Office Action dated Feb. 14, 2020.
PCT/US2018/034954 PCT International Search Report and Written Opinion dated Jul. 12, 2018.
PCT/US2018/038126 PCT International Search Report and Written Opinion dated Aug. 24, 2018.
PCT/US2018/034954 Chapter II Demand and Response to Written Opinion dated Mar. 26, 2019.
PCT/US2018/034954 Second Written Opinion dated Apr. 30, 2019.
PCT/US2018/034954 Chapter II International Preliminary Report on Patentability dated Sep. 3, 2019.
EP18731331.7 Response and amendment dated Jul. 24, 2020.
Abel, et al., "Preparation and Investigation of Antibacterial Carbohydrate-Based Surfaces", Carbohydrate Research, vol. 337, No. 24; pp. 2495-2499; Nov. 29, 2002.
Allison, et al., "Hemocompatibility of Hydrophilic Antimicrobial Copolymers of Alkylated 4-Vinylpyridine" Biomacromolecules; 2007, 8; pp. 2995-2999.
Borman, "Surfaces Designed to Kill Bacteria", Chemical & Engineering News; vol. 80, No. 22; pp. 36-38; Jun. 10, 2002.
Docherty, K., et al., "Toxicity and Antimicrobial Activity of Imidazolium and Pyridinium Ionic Liquids", Green Chemistry, vol. 7, pp. 185-189, Mar. 14, 2005, DOI: 10.1039/b419172b.
Kawabata, et al., "Antibacterial Activity of Soluble Pyridinium-Type Polymers", Applied and Environmental Microbiology; vol. 54, No. 10; pp. 2532-2535; Oct. 1988.
Krishnan, et al., "Antibacterial Coatings Based on Quatemized Poly(4-Vinylpyridine) Block Copolymers", Polymeric Materials: Science and Engineering; vol. 91; pp. 814-815; 2004.
Kugler, R., et al., "Evidence of a Charge-Density Threshold for Optimum Efficiency of Biocidal Cationic Surfaces", Microbiology, 151, 2005, pp. 1341-1348, DOI: 10.1099/mic.0.27526-0.
Li, et al., "Bactericidal Ability of a Soluble Pyridinium-Type Polymer Under Different Conditions"; pp. 177-178; National American Chemical Society Meeting, Anaheim, CA; Mar. 21-25, 1999.
Li, et al., "Effect of the Macromolecular Chain Structure of a Soluble Pyridinium-Type Polymer on Antimicrobial Activity"; pp. 175-176; National American Chemical Society Meeting, Anaheim, CA; Mar. 21-25, 1999.
Lin, et al., "Insights Into Bactericidal Action of Surface-Attached Poly(vinyl-N-hexylpyridinium) Chains", Biotechnology Letters, vol. 24, No. 10; pp. 801-805; May 2002.
Lin, et al., "Mechanism of Bactericidal and Fungicidal Activities of Textiles Covalently Modified With Alkylated Polyethylenimine", Biotech. Bioeng.; vol. 83, No. 2; pp. 168-172; Jul. 20, 2003.
Napper, D.H., "Steric Stabilization", Department of Physical Chemistry, University of Sydney, Journal of Colloid and Interface Science, vol. 58, No. 2, Feb. 1977, ISSN 0021-9797, pp. 390-407.
Sellenet, et al., "Hydrophilized Pyridinium Bactericidal Polymers", Fall National American Chemical Society Meeting, Washington, DC; Aug. 28-Sep. 1, 2005; pp. 2.
Sellenet, et al., "Synergistic Activity of Hydrophilic Modification in Antibiotic Polymers" Biomacromolecules; 2007, vol. 8, No. 1; pp. 19-23.

(56) References Cited

OTHER PUBLICATIONS

Sellenet, "Hydrophilized Bactericidal Polymers", Thesis, Purdue University, MSE, Dec. 2004; pp. 83.
Tadros, Tharwat F., "Emulsion Formation, Stability, and Rheology", pp. 1-75, 2013.
Tiller, et al., "Designing Surfaces That Kill Bacteria on Contact", Proc. Natl. Acad. Sci. USA; vol. 98, No. 11; pp. 5981-5985; May 22, 2001.
Tiller, et al., "Polymer Surfaces Derivatized With Poly(Vinyl-N-Hexylpyridinium) Kill Airborne and Waterborne Bacteria"; Biotechnology and Bioengineering;vol. 79, No. 4; pp. 465-471; Aug. 20, 2002.
Waschinski, C., et al., "poly(oxazoline)s with Telechelic Antimicrobial Functions", Biomacromolecules 2005, vol. 6, No. 1, pp. 235-243.
Wynne, et al., "Novel Polymer Bound Bactericidal Surfaces"; vol. 45, No. 2; pp. 521-522; Fall National American Chemical Society Meeting, Philadelphia, PA; Aug. 22-27, 2004.
Alternative Medicine Review, Undecylenic Acid Monograph, vol. 7, No. 1, 2002, pp. 68-70.
Selected Abstracts; Dec. 2004-Mar. 2005; pp. 3.
Surface Industry, Detergent Raw Material, Sodium Tripolyphosphate 94.0% (STPP Industrial Grade), pp. 1-2, XP055579364.
XP002783622, Database WPI, Week 199349, Thomson Scientific, London, GB, AN 1993-389137, pp. 4.
U.S. Appl. No. 15/163,285 Office Action dated Aug. 20, 2021.
U.S. Appl. No. 15/163,285 Notice of Allowance dated Aug. 30, 2021.
U.S. Appl. No. 16/938,680 Office Action dated Jan. 4, 2022.
U.S. Appl. No. 17/115,709 Office Action dated Jan. 18, 2022.
U.S. Appl. No. 17/115,709 Amendment dated Mar. 30, 2022.
U.S. Appl. No. 16/938,680 Amendment dated Apr. 4, 2022.
EP18731331.7 OA dated Apr. 11, 2022.
U.S. Appl. No. 17/115,709 Notice of Allowability dated May 19, 2022.
Beta Merriam Webster; Definition of Derivative by Merriam-Webster Dictionary; Dec. 9, 2015; http://beta.merriam-webster.com/dictionary/dervative; 10pp.
Cpolymer, "Polyquaternium-6", CAS No. 26062-79-3, www.cpolymerchem.com, Apr. 10, 2020, pp. 1.
Lubrizol Advanced Materials, Inc., Toxicology & Microbiology Studies, TOX-010, "Carbopol Aqua SF-1 Polymer", Jan. 2000, pp. 1.
Lubrizol Advanced Materials, Inc., Technical Data Sheet, TDS-294, "Carbopol Aqua SF-1 Polymer", Acrylates Copolymer, Feb. 7, 2013, pp. 9.
PubChem, "Polyquatemium-10", C25H50ClNO16, https://pubchem.ncbi.nlm.nih.gov/compound/Polyquaternium-10, Jan. 9, 2022, pp. 17.
PubChem, "Polyquatemium-6", https://pubchem.ncbi.nlm.nih.gov/#query="Polyquaternium 6", Jan. 9, 2022, pp. 2.
PubChem, "Methacrylamidopropyltrimethylammonium Chloride", C10H21ClN2O, pp. 1.
PolyCare133, UPI Chem, item No. 460034, CAS No. 68039-13-4, www.upichem.com, pp. 1.
Solvay, PolyCare133, Ross Organic an Azelis Company, pp. 1.
U.S. Appl. No. 16/938,680 Office Action dated Jun. 14, 2022.
U.S. Appl. No. 16/938,680 Amendment dated Jun. 27, 2022.
U.S. Appl. No. 16/938,680 Notice of Allowability dated Jul. 7, 2022.
U.S. Appl. No. 17/115,709 Amendment after Allowance dated Aug. 10, 2022.
EP18731331.7 Response and amendment dated Aug. 10, 2022.
EP18740003.1 Office Action dated Jul. 7, 2022.
EP18740003.1 Response and amendment dated Oct. 28, 2020.
Oxford Dictionary of Chemistry, 6th Edition, 2008, pp. 134-135 and 203.
"Sodium Dodecylbenzene Sulfonate (SDBS)", USDA Technical Evaluation Report, May 26, 2017, pp. 1-21.
U.S. Appl. No. 15/163,285 RCE and amendment dated Dec. 10, 2020.
U.S. Appl. No. 16/938,680 Preliminary amendment dated Dec. 17, 2020.
EP18740003.1 Amendment dated Nov. 9, 2022.
U.S. Appl. No. 17/865,886 Office Action dated Apr. 25, 2023.
U.S. Appl. No. 17/865,938 Office Action dated Apr. 26, 2023.
Strauss, et al., "The Transition from Typical Polyelectrolyte to PolySoap.II. Viscosity Studies of Poly-4-Vinylpyridine Derivatives in Aqueous KBr Solutions", J. Phys.Chem., vol. 60, pp. 577-584, May 1956.
U.S. Appl. No. 17/865,886 Amendment dated Apr. 29, 2023.

\* cited by examiner

POLYMERIC ANTIMICROBIAL SURFACTANT

CROSS-REFERENCE TO RELATED APPLICATIONS

This application is a Continuation of U.S. application Ser. No. 16/011,579, filed Jun. 18, 2018, and entitled "Polymeric

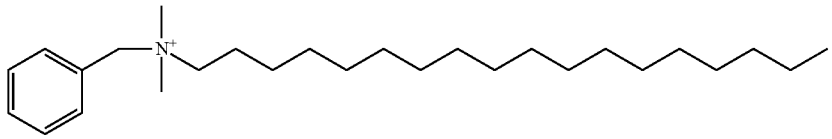

Cationic Surfactant Example

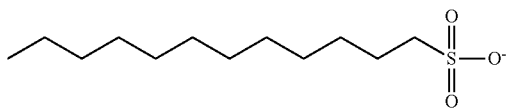

Anionic Surfactant Example

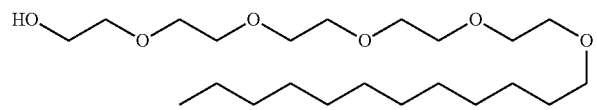

Nonionic Surfactant Example

Antimicrobial Surfactant," and claims the benefit of priority to U.S. Provisional Patent Application No. 62/521,313, filed Jun. 16, 2017, and entitled "Polymeric Antimicrobial Surfactant," the entire contents of each of which are incorporated by reference herein as if put forth in full below.

FIELD OF THE INVENTION

The invention relates to surfactants for suspensions, emulsions, latexes, and/or colloids that have at least two phases, a continuous aqueous or aqueous-organic phase and a dispersed hydrophobic phase (e.g., a latex binder system used in coatings formulations.)

BACKGROUND

The formulation of many aqueous and aqueous-organic coatings starts with a binder component. The binder component in water based systems is generally a latex resin consisting of but not limited to polymers of acrylics, vinyl acrylics, and/or styrene acrylics. The dispersion of the less polar substantially insoluble monomer and/or polymer particles in the more polar aqueous solvent system is accomplished by the addition of stabilizing surfactants.

Additionally, some grades of plastics are also produced initially from an emulsion polymerization process followed by isolation of the solid e.g. polyvinylidene fluoride, polyvinyl fluoride, and PTFE. The final polymeric product is formed by destabilizing or breaking the emulsion so that the small polymer particles separate from the aqueous phase and are isolated.

These stabilizing surfactants generally contain polar and non-polar domains that effectively reduce the surface tension present at the interface of polar and non-polar components. The polar component of these stabilizing surfactants may consist of positively charged cationic groups, negatively charged anionic groups, and/or non-ionic polar groups.

For example, latex paints comprise an emulsion of polymer particles dispersed in water. The emulsions commonly found in latex paint are inherently unstable and phase-separate, so surfactants are added to reduce interfacial tension and stabilize polymer particles to prevent demulsification. The following are examples of a cationic, an anionic, and a nonionic surfactant that may be used to stabilize the emulsion.

Anionic surfactants such as sodium dodecyl sulfate are most commonly used for stabilizing emulsions because of their affinity tier hydrogen bonding through the anionic sulfate head with the aqueous medium while anchored to the non-polar monomer/polymer particle through the aliphatic tail. The particle is stabilized through electrostatic repulsion.

Nonionic surfactants are rarely used alone due to their inferior efficiency in creating stable emulsions in comparison to anionic surfactants. Ionic surfactants are, however, sensitive to changes in ionic strength of the compositions they stabilize. Because of this, non-ionic surfactants are usually used in tandem with anionic and cationic surfactants and impart a second method of colloidal stabilization through steric interference of the van der Waals forces amid polymer and pigment particles. Latexes that require stability over large pH ranges use larger nonionic to anionic surfactant ratios.

Cationic surfactants are not commonly used due mainly to their higher costs. Cationic surfactants are frequently made up of quaternized ammonium compounds. Cationic surfactants frequently require the addition of nonionic surfactants to increase the stability of the latex. They are used in cases where their properties justify the additional cost. One example is in those cases where the resulting polymer emulsion is "broken" and the solid polymer is isolated.

Quaternary ammonium compounds are not typically added to already formed coating compositions that consist of a continuous aqueous or aqueous-organic phase containing a dispersed hydrophobic phase commonly stabilized by an anionic surfactant such as that used in a latex binder system. This is due to a negative effect on the quality and stability of the latex suspension. Quaternary ammonium compounds when added to latex-paint formulations have caused an undesirable increase in viscosity as well as permitting the dispersed polymer and pigments to agglomerate, flocculate, and settle. The emulsion is said to be "broken" in this case. Without being limited to any particular theory, it is believed that the cationic nature of the quaternary ammonium compounds is not compatible with the commonly anionic nature of latex paint formulations. In some cases, insoluble complexes of the quaternary ammonium compound and the latex stabilizing surfactant form, resulting in the effective reduction of surfactant concentration. This reduction of surfactant concentration causes the latex dispersion to destabilize, allowing the agglomeration of the various components of the composition. This results in a shorter shelf life and an undesirable appearance as the agglomerated particles cause the dry paint film to have a grainy appearance or texture.

This is particularly true where the quaternary ammonium compounds are polymers themselves. Polymers containing quaternary amines as part of their structure do not typically possess ionic and/or polar domains in high enough concentration to form stable micelles needed for construction of suspensions, emulsions, latexes, or colloids. Because of this lack of amphiphilicity or polarity, it is particularly difficult to prevent particles of hydrophobic organic polymers in aqueous or aqueous-organic carriers from precipitating and agglomerating. The hydrophobicity of an organic polymer causes the particles to rapidly separate from water and agglomerate into larger sized aggregates which may then irreversibly segregate yielding a non-homogeneous suspension. The polymeric particles have a much greater affinity for one another than the aqueous or aqueous-organic carriers and often clump together in the bottom of the container. Their relatively large surface area and affinity for one another virtually assures that, once the polymeric particles have clumped together and entangled, it is impossible to re-suspend the polymeric particles. This entanglement of polymer chains is often referred to as "pseudo cross-linking" due to the inhibition of solvation similar to that observed in covalently cross-linked polymers. The addition of nonionic surfactants may be required to enhance the stability of the suspension.

Additionally, quaternary ammonium compounds are known to be toxic above certain concentrations and irritants even at low concentrations, indicating a significant lack of biocompatibility. Quaternary ammonium compounds can display a range of health effects, amongst which are mild skin and respiratory irritation up to severe caustic burns on skin and gastrointestinal lining (depending on concentration), gastrointestinal symptoms (e.g., nausea and vomiting), coma, convulsions, hypotension and death. One example is Quaternium-15 which is the single most often found cause of allergic contact dermatitis of the hands.

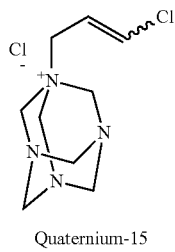 [SMILES: Cl ; ClC=CC[N+]12CN3CN(CN(C3)C1)C2]

Quaternium-15

BRIEF SUMMARY OF ASPECTS OF THE INVENTION

Among other embodiments, the invention provides a suspension-stabilizing surfactant, latex-stabilizing surfactant, emulsion-stabilizing surfactant and/or colloid-stabilizing surfactant that is also antimicrobial and biocompatible. The invention in one instance provides aqueous coating compositions that contain a polycationic polymeric antimicrobial surfactant such as a polymeric biocompatible antimicrobial surfactant and (a) a lipophilic phase and/or (b) a phase having otherwise insufficient inherent water dispersibility. The invention also provides antimicrobial coatings formed by drying the aqueous coating compositions. This polycationic polymeric antimicrobial surfactant or polymeric biocompatible antimicrobial surfactant can, in one instance, be part of a stable aqueous binder/carrier system in which this surfactant (a) aids in dispersing a latex binder that is hydrophobic or otherwise has insufficient inherent water dispersibility and/or (b) imparts antimicrobial properties to the binder/carrier system and/or binder as applied to an object. The invention also provides methods of dispersing a hydrophobic phase and/or hydrophobic particles in an aqueous phase, further, the invention provides methods of making the polymeric biocompatible antimicrobial surfactant and polymeric product that contains the surfactant. The invention also provides new methods of using existing polymers as a polycationic polymeric antimicrobial surfactant or polymeric biocompatible antimicrobial surfactant in such compositions.

DETAILED DESCRIPTION OF THE INVENTION

The invention in one instance provides a polycationic polymeric antimicrobial surfactant and a polymeric biocompatible antimicrobial surfactant that is soluble in an aqueous carrier such as water or water-based solution that aids in the formation and stability of a dispersed hydrophobic phase. The dispersed hydrophobic phase may consist of hydrophobic inorganic materials, small molecules, preformed polymers, or monomers that may be subsequently polymerized. The polymeric antimicrobial surfactant can form part of a stable aqueous dispersion that can be applied to a surface to form a coating.

Additionally the polymer prepared in the stable aqueous dispersion described above can be isolated by either removal of solvent, breaking of the emulsion or any other suitable means to give a solid polymer with intrinsic antimicrobial properties due to inclusion of the biocompatible antimicrobial surfactant in the solid polymer.

The polycationic polymeric antimicrobial surfactant is a polymer that can be represented as the polymerization product of at least two components introduced as monomers. The first component is a hydrophilic monomer that gives the resulting polymer its nonionic surfactant/biocompatibility properties. The second component is a quaternized or quaternizable monomer (referred to as the "cationic monomer" herein) such as a nitrogen-containing monomer or a phosphorous-containing monomer that gives the polymer its cationic surfactant antimicrobial properties. The combination of these two monomers followed by polymerization using techniques commonly used by those familiar with the art and with subsequent quaternization of the quaternizable atoms present using a quaternizing agent such as an appropriate activated alkyl compound if necessary yields the desired polycationic polymeric antimicrobial surfactant. The polymeric biocompatible antimicrobial surfactant may have a molecular weight of at least about 1000 Daltons, for instance.

The surfactant properties of the polymer provides an interface between the dispersed hydrophobic phase and the continuous aqueous phase. In many instances, the aliphatic hydrophobic domain portion of the polymeric antimicrobial resides within the dispersed hydrophobic phase due to its low polarity. The hydrophilic domain portion of the polycationic polymeric antimicrobial surfactant may have sufficient solvating ability in water that it can facilitate the polymer's dissolution in water. The cationic domain assists in both the surfactant properties of the polymer as well as supplying the cationic center required for the antimicrobial properties. Consequently, the cationic polymeric antimicrobial portion is not limited to being present in the disperse phase. Thus the polycationic polymeric antimicrobial surfactant has a chemical structure that provides a lipophilic portion and a hydrophilic portion as well as a cationic portion. The polymer is therefore adapted to interface with both the dispersed phase and the continuous phase. The polymer therefore typically resides as an interface layer between the disperse and continuous phases of a dispersion, thus stabilizing the dispersion through electrostatic and steric effects. The polymer combines the properties of a cationic surfactant and a nonionic surfactant into a single polymeric species. The following illustrates a simplified non-limiting example of the domains discussed.

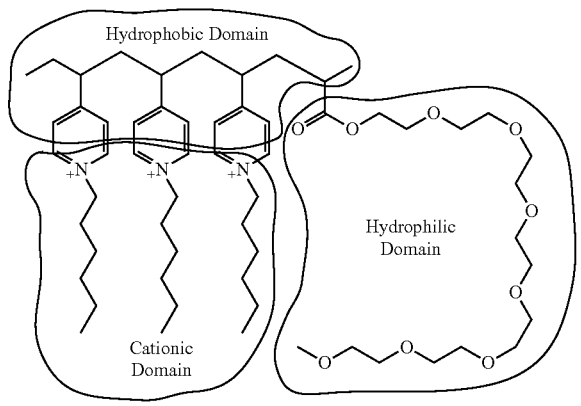 [SMILES: CCCCCC[n+]1ccc(C(CC)CC(CC(CC(C)C(=O)OCCOCCOCCOCCOCCOCCOCCOC)c2cc[n+](CCCCCC)cc2)c2cc[n+](CCCCCC)cc2)cc1]

Simplified Illustration of the Domains Present in the Invention

The cationic domain of a conventional polymer may cause the polymer to be antimicrobial. However, the cationic domain of a conventional polymer may be a relatively nonpolar cation or a cation that possesses polar portions but in a number insufficient to enable the cationic polymeric antimicrobial portion to be sufficiently soluble in the aqueous carrier, making the polymer potentially antimicrobial but not effective as a surfactant. The addition of a significant polar domain through the addition of one or more polar monomers enables a controlled adjustment of the overall amphiphilicity of the modified polymer in an aqueous solution. For instance, the polycationic polymeric antimicrobial surfactant or polymeric biocompatible antimicrobial surfactant may be a copolymer of a vinyl pyridine such as 4-vinylpyridine and e.g. (2-hydroxyethyl) methacrylate (HEMA), poly(ethylene glycol) methacrylate (PEGMA), and/or poly(ethylene glycol) methyl ether methacrylate (PEGMEMA) that has been quaternized with e.g. an alkyl from a halide compound such as butyl bromide as is disclosed in e.g. U.S. Pat. No. 8,343,473 issued Jan. 1, 2013 entitled "Hydrophilized Antimicrobial Polymers", which is incorporated by reference in its entirety for all that it teaches and for all purposes herein (this patent is therefore to be treated as if this patent is repeated in full below). The polymeric antimicrobial due to the presence of the hydrophilic monomer may be non-toxic and biocompatible so that the coating composition and the resultant coating or solid polymer may also be biocompatible.

The hydrophilic domain of the surfactant polymer is provided by a monomer or monomers that have a polar portion or portions in addition to e.g. a vinylic center or other reactive moiety that reacts with the latent cationic monomer of the antimicrobial portion to provide a copolymer. The hydrophilic monomer(s) may have one or more electronegative and/or electropositive atoms functioning as a nonionic surfactant domain to aid in dispersing the resulting polymeric antimicrobial surfactant particles within the coating solution (mixture) and in the vicinity of the disperse phase. The antimicrobial portion may also have a hydrophobic domain that is compatible with the disperse phase and/or the continuous phase. The hydrophobic domain may also contain a portion of the hydrophilic monomer, such as a vinylic portion of the monomer (e.g. a vinyl or vinyl portion of an ester). The hydrophilic domain of the surfactant imparts water solubility to the polymeric antimicrobial surfactant and thus does not destabilize the disperse phase. The hydrophilic surfactant portion also surprisingly does not interfere substantially and in fact may augment the antimicrobial activity of the cationic polymeric antimicrobial portion.

The amount of each monomer and their respective molecular weights are selected so that the copolymer has (a) sufficient hydrophilicity from the hydrophilic surfactant domain and (b) sufficient hydrophobicity from the hydrophobic domain and (c) antimicrobial activity from the cationic domain of the of the polycationic polymeric antimicrobial surfactant that a sufficient amount of the copolymer in the solution resides as an interface between the disperse phase and the continuous phase selected for the particular dispersion.

U.S. Pat. No. 8,343,473 generally discloses copolymers that may be adapted for use as a polycationic polymeric antimicrobial surfactant or polymeric biocompatible antimicrobial surfactant in forming compositions according to one aspect of the invention. One or more cationic monomers (e.g. nitrogen-containing monomers) may be copolymerized with one or more hydrophilic monomers to form the polymeric biocompatible antimicrobial surfactant. Examples of nitrogen-containing monomers may include a variety of vinyl monomers capable of free radical polymerization and/or quaternization. Accordingly, these monomers may include, but are not limited to, vinyl amines, such as N,N-dimethylvinylamine; N,N-dialkyl allyl amines; and/or tertiary amines in which at least one of the three substituents of nitrogen contains an unsaturation capable of participating in free radical polymerization and when quaternized is rendered antimicrobial.

A polycationic polymeric antimicrobial surfactant has multiple cations in its structure. For instance, a polycationic polymeric antimicrobial surfactant may contain three or more cationic sites by copolymerizing one or more hydrophilic monomers with 3 or more monomers that each have a single cationic site. Alternatively, a polycationic polymeric antimicrobial surfactant may be formed by copolymerizing one or more hydrophilic monomers with two or more monomers that each have two or more cationic sites. While a polycationic polymer can easily destabilize a dispersion in the form of a suspension or colloid such as a latex or an emulsion by complexing or otherwise interfering with a surfactant already present in the dispersion, a polycationic polymeric antimicrobial surfactant as provided herein can be formulated to augment and/or provide stability to a dispersion that includes an antimicrobial polymer containing multiple cationic sites. Preferably, the cations of the polycationic polymeric antimicrobial surfactant are quaternized nitrogen and/or phosphorous atoms. Also preferably, the hydrophilic monomer is selected to provide biocompatibility to the polycationic polymeric antimicrobial surfactant. A polymeric biocompatible antimicrobial surfactant may contain PEGMA, PEGMEMA, and/or HEMA for instance that aid in providing a biocompatible copolymer.

In a preferred embodiment, a pyridinium-type monomer, such as vinyl pyridine or 4-vinylpyridine, is quaternized after polymerization to a hydrophilic monomer.

A nitrogen-containing monomer may be inherently bactericidal or antimicrobial, or it may be rendered bactericidal or antimicrobial after polymerization with a hydrophilic monomer to form a copolymer. Where the copolymer undergoes a chemical modification, such as quaternization, preferably, the resultant copolymer is more hydrophilic and/or bactericidal or antimicrobial than a similarly modified (by e.g., quaternization) nitrogen-containing comonomer alone or copolymer containing the same number of nitrogen containing monomers as the copolymer.

A nitrogen-containing monomer may include or be chemically linked to a suitable bactericidal or antimicrobial moiety, including, but not limited to polycationic species, polycationic derivatives or combinations therefrom. Polycationic species may contain two or more quaternary ammonium groups with a molecular weight ranging from several hundred Daltons to a few hundred thousand Daltons. The quaternary ammonium groups may be part of a ring or they may be acyclic. Examples include but are not limited to: polyionenes, poly(diallyldimethylammonium chloride), dimethylamine-epichlorohydrin copolymers and imidazole-epichlorohydrin copolymers. Suitable nitrogen-containing monomers for use in the present invention may include the quaternary ammonium group-containing polymers disclosed in U.S. Pat. No. 4,482,680, which are incorporated by reference herein.

Polycationic species may contain two or more cationic groups. The cationic groups (e.g. amines) can be primary, secondary, tertiary, or mixtures thereof. The cationic groups may be part of a ring or they may be acyclic. Examples include but are not limited to: polyethyleneimines, polypropyleneimines, polyvinylamines, polyallylamines, polydiallylamines, polyamidoamines, polyaminoalkylmethacrylates, polylysines, and mixtures thereof.

The polycationic species may also be a modified polyamine with at least one amine group substituted with at least one other functional group. Examples include ethoxylated and alkoxylated polyamines and alkylated polyamines. Other suitable nitrogen-containing monomers or those that may be rendered bactericidal or antimicrobial may be identified and/or used in accordance with the applications and objectives set forth in the specification and any claims.

Quaternization may be carried out using alkylating agents, including but not limited to alkyl halides (such as hexyl bromide), alkyl sulfonates, alkyl mesylates, alkyl tosylates, or other alkylating agents possessing a suitable leaving group. Quaternization reduces self-polymerization of the bactericidal or antimicrobial comonomer upon polymerization with the hydrophilic monomer. Quaternization may confer increased bactericidal or antimicrobial activity and may be carried out after polymerization. The alkyl group of the alkylating agent and therefore the quaternized nitrogen-containing monomer may have from 4 to 12 carbon atoms, for instance, and preferably, the alkyl group has from 5 to 10 carbon atoms or 6 to 8 carbon atoms. The alkyl group may be linear or branched.

Alkyl groups at a quaternized site, and/or other cationic chains may be attracted to and/or promote interaction and penetration negatively charged bacterial cell walls on account of their lipophilic nature. Alkyl chain lengths of quaternizing agents and overall hydrophilic/lipophilic balance may affect bactericidal or antimicrobial activity of the polymeric compositions of the present invention. Accordingly, these variables may be modified to optimize or improve bactericidal or antimicrobial activity of the polymeric compositions.

Suitable hydrophilic monomers may include, but are not limited to, ethylene glycol (ethylene oxide); polyethylene glycol derivatives, including poly(ethylene glycol) methacrylate (PEGMA), including poly(ethylene glycol) methyl ether methacrylate, poly(ethylene glycol) acrylate, and vinyl polyethylene glycol; vinyl acetate; poly(vinyl alcohol); vinyl pyrrolidone and poly(vinyl pyrrolidone); vinyl pyrrolidinone and polyivinyl pyrrolidinone); vinyl oxazoline and poly(vinyl oxazoline); vinyl formamide and poly(vinyl formamide); hydroxyalkyl acrylates and hydroxyalkyl methacrylates, such as hydroxyethyl methacrylate (HEMA) and hydroxyethyl acrylate; methacrylamide; acrylamide and methacrylamide based monomers, such as acrylamide, N,N-dimethyl acrylamide, N-ethyl acrylamide, N-isopropyl acrylamide, and hydroxymethyl acrylamide; monomers containing one or more of the following functional groups: hydroxy, amino, ammonium, ether, carboxylate, amide, and sulfonamide groups; and combinations or copolymers thereof, polyvinyloxazolines Preferably, a hydrophilic monomer is biocompatible or imparts biocompatibility to the surfactant in which it is incorporated. Standard assays may be utilized to evaluate biocompatibility, including but not limited to viability/cytotoxicity mammalian cell assays and the like. Preferred hydrophilic monomers may include hydroxyethylmethacrylate (HEMA), poly(ethylene glycol) methacrylate (PEGMA), and poly(ethylene glycol) methyl ether methacrylate (PEGMEMA).

HEMA is widely used in biomedical applications and devices, most prominently soft contact lenses. HEMA, with 37.8% water per weight, is typical of hydrogels. Preferably, the molar ratio of cationic monomer such as 4-vinyl pyridine to HEMA comonomer in the copolymer is between 30:70 and 95:5, and preferably the molar percentage of HEMA comonomer is at least 90%, with 90-95% being preferred.

Poly(ethylene glycol) methacrylate (PEGMA) and poly(ethylene glycol) methyl ether methacrylate (PEGMEMA) are monomers which provide several important properties, such as good solubility in both organic and aqueous media, low toxicity, immunogenicity and biocompatibility to copolymers they are present in.

Preferably, the molar molecular weight of PEGMA and/or poly(ethylene glycol) methyl ether methacrylate monomer used in forming the surfactant is equal to or greater than 300, more preferably between about 300 and about 2000, including but not limited to 1000. Preferably, the molar ratio of cationic monomer such as 4-vinyl pyridine to PEGMA and/or PEGMEMA is between about 10:90 and 99:1, and more preferably is between 30:70 and 95:5.

The polymeric antimicrobial surfactant may be formed by free radical polymerization or by other methods. Any of the surfactants as discussed herein may be a block or random copolymer, for instance.

For example, a polycationic polymeric antimicrobial surfactant or polymeric biocompatible antimicrobial surfactant may be represented as the polymerization product of monomers of (a) poly(ethylene glycol) methyl ether methacrylate as the surfactant's hydrophilic surfactant portion and (b) monomers of vinyl pyridine as the surfactant's hydrophobic and cationic polymeric antimicrobial portion. If the molecular weight of the poly(ethylene glycol) methyl ether methacrylate is about 1000, preferably the copolymer has between about 8-72 mol % of monomer (a) and between about 92-28 mol % of monomer (b). More preferably, the copolymer has between about 8-40% of monomer (a) and between about 92-60% of monomer (b). These percentages are provided as guidelines to aid in selecting the types and amounts of monomers for the polymeric biocompatible antimicrobial surfactant for various disperse phases and are not to be construed as limiting the scope of the invention.

The polycationic polymeric antimicrobial surfactant (including the polymeric biocompatible antimicrobial surfactant) is formulated to significantly reduce the growth, number, viability and/or metabolic activity of bacteria or microorganisms. The surfactant may be formulated to significantly reduce bacterial or microbial growth from a treated medium by a factor of at least 50%. Further, a bactericidal or antimicrobial composition may be formulated to significantly reduce bacterial or microbial growth from a treated medium by at least 60%, by at least 70%, by at least 80%, by at least 90%, by at least 95%, by at least 99%, or by at least 99.9%. This reduction may occur within a 30 minute period, for example.

The polycationic polymeric antimicrobial surfactant alone (without other surfactants) may be all that is needed to disperse e.g. a binder (such as polymeric particles) in a liquid. The hydrophobic domain of the polymeric biocompatible antimicrobial surfactant can associate with polymeric particles to disperse them in e.g. an aqueous carrier liquid with which the hydrophilic domain of the polymeric biocompatible antimicrobial surfactant associates. The cationic domain can also associate with the aqueous carrier liquid where ionic charge predominates the structure of the cationic domain and the dispersed hydrophobic phase where the structure of the cationic domain is hydrophobic overall despite the cationic charge.

A second surfactant may also be present with the polycationic polymeric antimicrobial surfactant in the carrier liquid. A second surfactant can be provided to e.g. stabilize binder (polymeric particles that form a solid coating upon solvent removal or destabilization of the dispersion) or other components dispersed in the carrier liquid. The second surfactant may be cationic, anionic, or nonionic.

If the second surfactant is cationic, preferably the cationic portion of that second surfactant has greater binding strength to a corresponding anion than the cationic domain of the polycationic polymeric antimicrobial surfactant has to that corresponding anion. Preferably the cationic portion of the second surfactant also has greater binding strength to its corresponding anion than it has to any anions present in the polycationic polymeric antimicrobial surfactant.

If the second surfactant is anionic, preferably the anionic portion of that second surfactant has greater binding strength to a corresponding cation than to the cationic domain of the polycationic polymeric antimicrobial surfactant. Preferably the anionic portion of that second surfactant also has greater binding strength to that corresponding cation than any anions present in the polycationic polymeric antimicrobial surfactant.

An example of a coating composition may be e.g. a latex paint formulation containing, in addition to the polycationic polymeric antimicrobial surfactant or polymeric biocompatible antimicrobial surfactant, any one or more of the following components:
  a. A second surfactant that disperses one or more of the following components.
  b. Latex polymer (e.g. acrylic, vinyl acrylic, or styrene acrylic polymer) that has been prepared using an appropriate polymeric biocompatible antimicrobial surfactant as described in this invention.
  c. Pigment and/or dye such as $TiO_2$, calcium carbonate, talc, clay, silicates, aluminum silicates, calcium metasilicates, aluminum potassium silicates, magnesium silicates, barium sulfates, nepheline syenite, feldspar, zinc oxides and/or sulfides, functional fillers such as intumescent ingredients, such as ammonium polyphosphates, melamines, pentaerythritol and/or similar compounds.
  d. Thickeners such as urethane thickeners and/or acrylic thickeners.
  e. Synthetic organic materials might also be incorporated; these include plastic beads, hollow spheres or other similar materials.
  f. Other optional components include glycols such as ethylene and/or propylene glycol in amounts up to about 7% and other solvents such as diethylene glycol dibenzoate and dipropylene glycol dibenzoate in amounts up to about 3%. The coating composition may also contain pigment dispersing agents which can be solvents; wet paint preservatives; dry film preservatives; foam control agents such as oils, and silicones; slip and mar additives; adhesion promoters, and/or other known paint additives.
  g. The paint composition of the present invention may also comprise other biocides including but not limited to metal ion containing compounds, other polymeric biocides, heterocyclic compounds, phenols, organometallics, aldehydes, proteins, peroxygens, alcohols, enzymes, polypeptides, and halogen releasing compounds.

The coating solution may have a pH of about neutral pH to acidic pH. The pH is preferably between e.g. 2 and 9, more preferably between 5.5 and 6.5.

Other coating solutions into which the dispersible polymeric antimicrobial particles may be incorporated include, but are not limited to, floor wax binders, adhesives, sealants, caulks, furniture polish, synthetic rubber compositions, and plastic compositions.

Floor wax is typically a surfactant stabilized dispersion of a polymer or polymers that impart the floor wax's finish, a polymeric binder, as well as various coalescents and plasticizers and other components in an aqueous or aqueous-organic continuous phase. An example of such a floor wax is one that has a styrene-ethyl acrylate-methyl methacrylate copolymer binder emulsion, polyethylene emulsion, tricresyl phosphate plasticizer, and styrene-maleic copolymer as disclosed in e.g. U.S. Pat. No. 3,328,328, which patent is incorporated by reference in its entirety.

There is a surprising array of modern adhesives having a broad range of components to optimize their use in the particular situation for which they are intended. Most water born adhesives have as one of the components a dispersed polymer in an aqueous continuous phase. The dispersed polymer may be made up of any of a wide array of polymers e.g. polyvinyl acetate, vinyl acetate copolymer, polyacrylate, polyvinylidene chloride, styrene-butadiene copolymer, polyurethane, polyester, polychloroprene, and/or rubber latex. White glue or carpenter's glue are the best known examples of water born adhesives.

A sealant or caulk may typically have a silicone polymer dispersed in an aqueous phase or such polymers as butyl rubbers and polybutene dispersed in aqueous phase. Sealants and caulks are similar in composition to adhesives in that many contain one or more water dispersed polymer latexes as one of their components. The dispersions are formed using an emulsifying surfactant in an emulsion polymerization scenario.

A furniture polish may contain one or more of the following hydrophobic materials dispersed in an aqueous phase by use of a surfactant: carnauba wax, candelilla wax, sugar cane wax, cotton wax, beeswax, shellac, lanolin fractions from sheep, ozokerite, paraffin waxes, microcrystalline waxes, oxidized microcrystalline waxes, Fischer-Tropsch waxes, montan waxes, polymers such as methyl acrylate, ethyl acrylate, butyl acrylate, vinyl acetate, styrene, vinyl chloride, acrylonitrile, and oils such as those derived from vegetable, petroleum, or silicone sources to enhance shine.

Synthetic rubber compositions are sometimes prepared through a polymerization process carried out as a surfactant stabilized dispersion. A particularly important example of such a synthetic process is the preparation of Neoprene. Neoprene is produced by free-radical polymerization of chloroprene. In commercial production, this polymer is prepared by free radical emulsion polymerization. Polymerization is initiated using potassium persulfate. Bifunctional nucleophiles, metal oxides (e.g. zinc oxide), and thioureas are used to crosslink individual polymer strands.

Plastic compositions are also prepared in some instances through a surfactant stabilized polymerization phase. An excellent example where a plastic is prepared through a surfactant stabilized emulsion process would be the production of polytetrafluoroethylene) (Teflon, PTFE). Because PTFE is poorly soluble in almost all solvents, and the polymerization is sensitive to temperature fluctuations it is conducted as an emulsion in water. This process gives a suspension of polymer particles which are then isolated as solid particles.

An ink composition can also be formulated using a surfactant of the invention. The pigment particles (typically 0.005 to 15 micron in size) and/or dye of an ink formulation can associate with the hydrophobic portion of the surfactant, thereby suspending the ink's pigment particles and dyes in aqueous carrier liquid more readily to provide a more homogeneous ink formulation. Ink compositions such as those used in inkjet printers and in the commercial print industry must also meet certain toxicity requirements that a polymeric biocompatible antimicrobial surfactant as disclosed herein can help to satisfy. Pigment particles and dyes in ink compositions include sulfated polyazo black dye and various pigment particles available from commercial suppliers such as Hoechst, Ciba-Geigy, Mobay, and BASF, for instance. In addition to pigment particles and dyes that can be dispersed using a polycationic polymeric antimicrobial surfactant or polymeric biocompatible antimicrobial surfactant, ink formulations may contain optical brighteners such as stilbenes (e.g, bis(benzoxazolyl)-cis-stilbene or 4,4'-diamino-2,2'-stilbenedisulfonic acid) and/or thiophenes (e.g. 2,5-bis(benzoxazol-2-yl)thiophene) that can be dispersed using a polycationic polymeric antimicrobial surfactant or polymeric biocompatible antimicrobial surfactant as discussed herein.

Other products that may utilize a surfactant as provided herein include detergents such as laundry detergent and/or softening agents such as fabric softeners. Brighteners such as the stilbenes and thiophenes discussed above can be dispersed in liquid or dry laundry detergents, and the polycationic polymeric antimicrobial surfactant or polymeric biocompatible antimicrobial surfactant as discussed herein can aid in dispersing the brighteners and/or other laundry detergent components or other fabric softeners throughout the wash water to better contact clothing while optionally providing antimicrobial properties to the laundered clothing. Clothes can therefore remain fresher for longer periods of time. A polycationic polymeric antimicrobial surfactant or polymeric biocompatible antimicrobial surfactant may be provided alone or as one of a number of other softener components in a clothes softening composition, and other such softeners include mono- and di-ester quats and derivatives that are typically used in such clothes softening compositions.

Cosmetics may incorporate a polycationic polymeric antimicrobial surfactant or polymeric biocompatible antimicrobial surfactant as discussed herein. These surfactants can disperse brighteners, oils or oily compounds such as coconut oil, castor oil, shea butter, and derivatives in e.g. foundation, eye shadow, lipstick, blush, makeup, and other cosmetics. The antimicrobial properties of a polymeric biocompatible antimicrobial surfactant may aid in keeping skin healthy as well as preserve the cosmetic itself, increasing shelf life.

Herbicides and insecticides can also benefit from incorporation of a polycationic polymeric antimicrobial surfactant or polymeric biocompatible antimicrobial surfactant into them. The polycationic polymeric antimicrobial surfactant or polymeric biocompatible antimicrobial surfactant can disperse common herbicides such as atrazine and common insecticides such as organophosphates, carbamates, pyrethroids, and other compounds as well as prevent potential microbial induced degradation thus increasing shelf life.

It was quite surprising that a polycationic polymeric antimicrobial compound or a biocompatible antimicrobial polymer could be configured as a surfactant. Typically, antimicrobial polymers do not possess both sufficient lipophilicity and sufficient hydrophilicity to satisfy the requirements for a surfactant, and the cations of the antimicrobial polymer often disrupt stable dispersions present in a carrier liquid. We have determined, however, that antimicrobial polymers can in fact be configured to be biocompatible as well as lipophilic and hydrophilic without sacrificing antimicrobial properties. Consequently, a wide array of suspensions, emulsions, latexes, and/or colloids useful in the preparation of coatings, adhesives, sealants, and caulks as disclosed herein can be formulated using a polycationic polymeric antimicrobial surfactant or a polymeric biocompatible antimicrobial surfactant as disclosed herein.

A general method for preparation of a stable suspension of a hydrophobic monomer solution in an aqueous continuous phase is conducted as follows. The surfactant, derived from this invention, is dissolved in the aqueous/aqueous-organic continuous phase in sufficient quantity concentration to support the formation of micelles that will contain the monomers. An initiator that is soluble in the aqueous continuous phase and insoluble in the monomer phase is added. The monomer(s) are then added to the aqueous phase with agitation forming droplets. Monomer(s) diffuse to the nascent micelles where they come in contact with a free radical originating from decomposition of the initiator. While some initiation may occur in the aqueous phase as well as the droplet phase the majority occurs in the micelles.

The monomer solution is added to the reaction mixture over time in order to reduce the incidence of initiation occurring in the droplet phase. Monomer(s) continues to diffuse from the droplets to the micelles growing the size of the polymer particle as well as to nascent micelles depending on the quantity of surfactant added. This process results in a polymer suspension/emulsion latex or colloid that contains a surfactant that is antimicrobial. Additional antimicrobial surfactant can be added upon completion of polymerization if additional efficacy is required.

Alternatively a stable suspension of a hydrophobic monomer(s) solution in an aqueous or aqueous/organic continuous phase may be formed and polymerized using the following methodology. A polycationic polymeric antimicrobial surfactant of this invention is dissolved in the aqueous or aqueous/organic continuous phase at a concentration that will be sufficient to give the level of antimicrobial activity desired (e.g. 1% by weight in solution). The monomer(s) are added as a single aliquot. The heterogeneous mixture is then agitated such that sufficient energy is input to give the desired particle size of the dispersed phase. A high shear mixer may be used to supply the necessary agitation. After the suspension of monomers is formed and stabilized by the added surfactant, agitation may be reduced substantially to the point where the suspension remains homogeneous. A free radical initiator that is soluble in the continuous phase but not in the dispersed phase is then added and the suspension is heated to conduct the polymerization reaction. The resultant polymer or polymer/oil phase is consequently dispersed through the continuous phase by the polycationic polymeric antimicrobial surfactant.

Polycationic polymeric antimicrobial surfactant possessing suitable bactericidal properties and a suitable hydrophilicity biocompatibility profile was obtained using a quaternized polymeric composition synthesized from 4-vinylpyridine and poly(ethylene glycol) methacrylate. The copolymer was synthesized by radical copolymerization using 2,2'-azobis(2-methylpropionamidine) dihydrochloride (AAPH) as the initiator in a water-isopropanol solvent system. The reactants were stirred at 70° C. for 24 hours under flowing $N_2$ to exclude oxygen. The resulting copolymer was quaternized by the addition of one equivalent (relative to 4-vinylpyridine) of 1-bromohexane (HB) in a followed by heating at 70° C. for 48 hr. The progress of the quaternization reaction was followed by infrared spectroscopy. The solid polymer was obtained placing the polymer/solvent mixture in trays and heating to 70° C. overnight.

Following are other examples of the invention. Table 1 lists various monomers used to form polycationic polymeric antimicrobial surfactant and various polymeric biocompatible antimicrobial surfactants, as recognized from the copolymerization and quaternization products formed using the specified compounds. The quaternizing agent is 1-butyl chloride and/or fluoride in certain instances not listed, and in other instances the quaternizing agent is 1-chlorooctane and/or 1-fluorooctane.

TABLE 1

Examples of polymeric cationic antimicrobial compounds for use in the invention

| No. | Monomer 1 | Monomer 2 | Quaternizer | Moles Monomer 1 | Moles Monomer 2 |
|---|---|---|---|---|---|
| 1 | 4-VP | HEMA | 1-bromohexane | 0.9 | 0.1 |
| 2 | 4-VP | PEGMEMA 300 | 1-bromohexane | 0.9 | 0.1 |
| 3 | 4-VP | PEGMEMA 1000 | 1-bromohexane | 0.9 | 0.1 |
| 4 | 4-VP | PEGMA 300 | 1-bromohexane | 0.9 | 0.1 |
| 5 | 4-VP | PEGMA 1100 | 1-bromohexane | 0.9 | 0.1 |
| 6 | 4-VP | HEA | 1-bromohexane | 0.9 | 0.1 |
| 7 | 4-VP | HEMA | 1-bromohexane | 0.6 | 0.4 |
| 8 | 4-VP | PEGMEMA 300 | 1-bromohexane | 0.6 | 0.4 |
| 9 | 4-VP | PEGMEMA 1000 | 1-bromohexane | 0.6 | 0.4 |
| 10 | 4-VP | PEGMA 300 | 1-bromohexane | 0.6 | 0.4 |
| 11 | 4-VP | PEGMA 1100 | 1-bromohexane | 0.6 | 0.4 |
| 12 | 4-VP | HEA | 1-bromohexane | 0.6 | 0.4 |
| 13 | 4-VP | H EMA | 1-bromohexane | 0.3 | 0.7 |
| 14 | 4-VP | PEGMEMA 300 | 1-bromohexane | 0.3 | 0.7 |
| 15 | 4-VP | PEGMEMA 1000 | 1-bromohexane | 0.3 | 0.7 |
| 16 | 4-VlP | PEGMA 300 | 1-bromohexane | 0.3 | 0.7 |
| 17 | 4-VP | PEGMA 1100 | 1-bromohexane | 0.3 | 0.7 |
| 18 | 4-VP | HEA | 1-bromohexane | 0.3 | 0.7 |
| 19 | N,N-DMAA | HEA | Hexyl Tosylate | 0.9 | 0.1 |
| 20 | 4-VP | HEMA | 1-Chlorohexane | 0.9 | 0.1 |
| 21 | 4-VP | PEGMEMA 300 | 1-Chlorohexane | 0.9 | 0.1 |
| 22 | 4-VP | PEGMEMA 1000 | 1-Chlorohexane | 0.9 | 0.1 |
| 23 | 4-VP | PEGMA 300 | 1-Chlorohexane | 0.9 | 0.1 |
| 24 | 4-VP | PEGMA 1100 | 1-Chlorohexane | 0.9 | 0.1 |
| 25 | 4-VP | HEA | 1-Chlorohexane | 0.9 | 0.1 |
| 26 | 4-VP | HEMA | 1-Chlorohexane | 0.6 | 0.4 |
| 27 | 4-VP | PEGMEMA 300 | 1-Chlorohexane | 0.6 | 0.4 |
| 28 | 4-VP | PEGMEMA 1000 | 1-Chlorohexane | 0.6 | 0.4 |
| 29 | 4-VP | PEGMA 300 | 1-Chlorohexane | 0.6 | 0.4 |
| 30 | 4-VP | PEG MA 1100 | 1-Chlorohexane | 0.6 | 0.4 |
| 31 | 4-VP | HEA | 1-Chlorohexane | 0.6 | 0.4 |
| 32 | 4-VP | HEMA | 1-Chlorohexane | 0.3 | 0.7 |
| 33 | 4-VP | PEGMEMA 300 | 1-Chlorohexane | 0.3 | 0.7 |
| 34 | 4-VP | PEGMEMA 1000 | 1-Chlorohexane | 0.3 | 0.7 |
| 35 | 4-VP | PEGMA 300 | 1-Chlorohexane | 0.3 | 0.7 |
| 36 | 4-VP | PEGMA 1100 | 1-Chlorohexane | 0.3 | 0.7 |
| 37 | 4-VP | HEA | 1-Chlorohexane | 0.3 | 0.7 |

HEM: 2-hydroxyethylmethacrylate
PEGMA: poly(ethylene glycol) methacrylate, number indicates the average molecular weight of the monomer
PEGMEMA: poly(ethylene glycol)methylether methacrylate, number indicates the average molecular weight of the monomer
HEA: 2-hydroxyethyl acrylate
DMAA: 1,3-dimethylallylamine Table 2 provides a list of other components that may be dispersed using a polycationic polymeric antimicrobial surfactant or polymeric biocompatible antimicrobial surfactant of Table 1 as well as products in which the particular component and polycationic polymeric antimicrobial surfactant or polymeric biocompatible antimicrobial surfactant are dispersed. Table 2 provides examples of the dispersed materials and is, of course, a nonexhaustive list. Each of the surfactants of Table 1 is individually combined with each of the dispersed polymers or compounds below in a carrier liquid (e.g. water or an oil) and other compounds as appropriate to form the products listed in Table 2.

TABLE 2

Examples of dispersed materials and products incorporating same

| Example | Dispersed polymer or compound | Product incorporating the dispersed material |
|---|---|---|
| A | Castor Oil | Cosmetics |
| B | Triglycerides | Cosmetics |
| C | Cocoa Butter | Cosmetics |
| D | Vitamin E Esters | Cosmetics |
| E | Polyisobutylene | Cosmetics |
| F | Various Natural and Synthetic Waxes | Cosmetics |
| G | Borax | Cosmetics |

TABLE 2-continued

Examples of dispersed materials and products incorporating same

| Example | Dispersed polymer or compound | Product incorporating the dispersed material |
|---|---|---|
| H | Mineral Oil | Cosmetics |
| I | Jojoba Oil | Cosmetics |
| J | Alkyds | Coating components |
| K | Polyurethanes | Coating components |
| L | Polyesters | Coating components |
| M | Melamine Resins | Coating components |
| N | Epoxy Resins | Coating components |
| O | Silanes | Coating components |
| P | Siloxanes | Coating components |
| Q | Various Oils | Coating components |
| R | Pigments | Coating components |
| S | Cutting Fluid Lubricants for Metal Working | Industrial components |
| T | Petrolatum (creams) | Pharmaceuticals |
| U | Lanoline (creams) | Pharmaceuticals |
| V | Actives in Oil (lotions) | Pharmaceuticals |

Table 3 lists other surfactants that may be present with polycationic polymeric antimicrobial surfactant and typical commercial uses.

TABLE 3

Additional surfactants present in some dispersions

| Surfactant | Surfactant Type | Use |
|---|---|---|
| Behentrimonium Chloride | Cationic | Cosmetics |
| Benzalkonium Chloride | Cationic | Laundry Detergent |
| Benzethonium Chloride | Cationic | Cosmetics/Mouthwash |
| Benzododecinium Bromide | Cationic | General |
| Bronidox | Cationic | Cosmetics |
| Carbethopendecinium Bromide | Cationic | General |
| Cetalkonium Chloride | Cationic | Excipient |
| Cetrimonium Bromide | Cationic | Cosmetics |
| Cetrimonium Chloride | Cationic | Hair Conditioner/Shampoos |
| Cetylpyridinium Chloride | Cationic | Mouthwash/Toothpaste |
| Didecyldimethylammonium Chloride | Cationic | Linen Disinfectant Cleaner |
| Dimethyldioctadecylammonium Bromide | Cationic | Cosmetics |
| Dimethyldioctadecylammonium Chloride | Cationic | Cosmetics |
| Domiphen Bromide | Cationic | Cosmetics |
| Octenidine Dihydrochloride | Cationic | Antiseptic Detergent |
| Olaflur | Cationic | Dental |
| N-Oleyl-1,3-propanediamine | Cationic | Paint |
| Stearalkonium Chloride | Cationic | Cosmetics/Conditioners |
| Thonzonium Bromide | Cationic | Pharmaceutical Detergent |
| Ethoxylates: | Nonionic | All of the uses above |
| Fatty Alcohol Ethoxylates | Nonionic | |
| Alkylphenol Ethoxylates | Nonionic | |
| Fatty Acid Ethoxylates | Nonionic | |
| Special Ethoxylated Fatty Esters and Oils | Nonionic | |
| Ethoxylated Amines and/or Fatty Acid Amides | Nonionic | |
| Terminally Blocked Ethoxylates | Nonionic | |
| Fatty Esters of Polyhydroxy Compounds: | Nonionic | All of the uses above |
| Fatty Acid Esters of Glycerol | Nonionic | |
| Fatty Acid Esters of Sorbitol | Nonionic | |
| Fatty Acid Esters of Sucrose | Nonionic | |
| Alkyl Polyglucosides | Nonionic | |
| Other: | | All of the uses above |
| Amine Oxides | Nonionic | |
| Sulfoxides | Nonionic | |
| Phosphine oxides | Nonionic | |

Table 4 provides a list of various microbes against which the polycationic polymeric antimicrobial surfactant, dispersed in an aqueous carrier, may be effective. Kill tests have been performed against these microbes for certain polycationic polymeric antimicrobial surfactants as disclosed, and the polycationic polymeric antimicrobial surfactants have reduced levels of these microbes substantially. Data was generated using the methodology set out in ASTM E 2315-03 (2008) for a period of exposure of microbe to polycationic polymeric antimicrobial surfactant ranging from 1 minute to 30 minutes.

TABLE 4

Microbes reduced or eliminated by selected polycationic polymeric antimicrobial surfactants

| | Kingdom | Family | Genus | Species | ATCC | Gram | % Kill |
|---|---|---|---|---|---|---|---|
| 1 | Bacteria | Bacillaceae | *Bacillus* | cereus | | Pos | 99.94 |
| 2 | Bacteria | Clostridiaceae | *Clostridium* | Difficile (spore) | 43598 | Pos | 80.19 |
| 3 | Bacteria | Enterococcaccae | *Enterococcus* | faecalis | 51799 | Pos | 99.998 |
| 4 | Bacteria | Staphylococcaceae | *Staphylococcus* | aureus | 33597 | Pos | 99.947 |
| 5 | Bacteria | Staphylococcaceae | *Staphylococcus* | aureus | 6538 | Pos | 99.9989 |
| 6 | Bacteria | Staphylococcaceae | *Staphylococcus* | epidermidis | | Pos | 99.999 |
| 8 | Bacteria | Enterobacteriaceae | *Enterobacter* | aerogenes | | Neg | 99.998 |
| 9 | Bacteria | atterobacteriaceac | *Escherichia* | coli | 11229 | Neg | 87.44 |
| 10 | Bacteria | Enterobacteriaceae | *Escherichia* | coli | 8739 | Neg | 90.15 |
| 11 | Bacteria | Enterocoeaceae | *Klebsiella* | pneumoniae | | Neg | 99.9991 |
| 12 | Bacteria | Enterococcaceae | *Salmonella* | enterica | 4352 | Neg | 99.9991 |
| 13 | Bacteria | Pseudonionadaceac | *Pseudomottas* | aeruginosa | 15442 | Neg | 99.9995 |
| 14 | Fungi | Saccharomycetaceae | *Candida* | albicans | 10231 | N/A | 90.05 |
| 15 | Fungi | Trichocomaccae | *Aspergillus* | brasiliensis niger | | N/A | 24.53 |
| 16 | Virus | Leviviridae | *Levivirus* | bacteriophage MS2 | | N/A | 99.996 |

Consequently, in addition to the inventions described above, the following are examples of the invention:

1. A polycationic polymeric antimicrobial compound for use as a surfactant, wherein the compound comprises a polymer having a hydrophilic monomer and a cationic antimicrobial monomer, wherein the polymer has a sufficient number of hydrophilic monomers present to provide a hydrophilic domain, a sufficient number of cationic antimicrobial monomers and vinylic groups from the hydrophilic monomers to provide a hydrophobic domain, and the number of cationic antimicrobial monomers present is sufficient to provide at least three cations in the polymer.
2. A compound according to paragraph 1, wherein the hydrophilic, monomer is nonionic.
3. A compound according to paragraph 1 or paragraph 2, wherein the nonionic hydrophilic monomer comprises at least one of HEMA, PEGMA, and PEGMEMA.
4. A compound according to any of paragraphs 1-3, wherein the nonionic hydrophilic monomer renders the compound biocompatible.
5. A compound according to any of paragraphs 1-4, wherein the cationic antimicrobial monomer contains a quaternized amine.
6. A compound according to paragraph 5, wherein the quaternized amine is a portion of a quaternized pyridine.
7. A compound according to paragraph 6, wherein the quaternized pyridine is 4-vinyl pyridine.
8. A compound according to any of paragraphs 5-7, wherein the amine is quaternized with an alkyl group.
9. A compound according to paragraph 8, wherein the alkyl group has alkyl group has from 4 to 12 carbon atoms.
10. A compound according to paragraph 9, wherein the alkyl group has alkyl group has from 5 to 10 carbon atoms.
11. A compound according to paragraph 10, wherein the alkyl group has alkyl group has from 6 to 8 carbon atoms.
12. A compound according to any of paragraphs 8-11, wherein the alkyl group is a linear alkyl.
13. A compound according to any paragraph above, wherein the polymer consists essentially of the nonionic hydrophilic monomer and the cationic antimicrobial monomer.
14. A dispersion comprising a polycationic polymeric antimicrobial surfactant, a continuous liquid phase, and particles of a second compound dispersed by the polycationic polymeric antimicrobial surfactant, wherein the dispersion comprises a suspension or a colloid and wherein the polycationic polymeric antimicrobial surfactant comprises a polycationic polymeric antimicrobial compound of any of paragraphs 1-13.
15. A dispersion according to paragraph 14, wherein the particles of the second compound comprise droplets or particulate of a compound selected from Table 2.
16. A dispersion according to paragraph 14 or paragraph 15, wherein the polycationic polymeric antimicrobial surfactant comprises particles of the polycationic polymeric antimicrobial compound.
17. A dispersion according to any of paragraphs 14-16, wherein the particles of the second polymer comprise a binder polymer of a coating.
18. A dispersion according to any of paragraphs 14-17, wherein the dispersion is a latex or an emulsion.
19. A dispersion according to any of paragraphs 14-18, wherein the continuous liquid phase is aqueous.
20. A dispersion according to any of paragraphs 14-18, wherein the continuous liquid phase is an oil.
21. A dispersion according to paragraph 20, wherein the dispersion comprises an aqueous phase.
22. A dispersion according to paragraph 19, wherein the dispersion comprises an oil phase.
23. A dispersion according to any of paragraphs 14-22, wherein the dispersion further comprises a second nonionic or cationic surfactant different from the polycationic polymeric antimicrobial surfactant.
24. A dispersion according to paragraph 23, wherein the second nonionic or cationic surfactant comprises a surfactant selected from Table 3 above.
25. A dispersion according to paragraph 24, wherein the second nonionic or cationic surfactant provides a stable dispersion of droplets or particulate of a compound selected from Table 2.
26. A dispersion according to any of paragraphs 14-22, wherein the dispersion contains no other surfactant besides the polycationic polymeric antimicrobial surfactant.
27. A dispersion according to any of paragraphs 14-26, wherein the dispersion comprises a stable suspension.
28. A dispersion according to any of paragraphs 14-26, wherein the dispersion comprises a stable colloid.
29. A dispersion according to paragraph 28, wherein the stable colloid comprises a latex.
30. A dispersion according to paragraph 28, wherein the stable colloid comprises an emulsion.
31. A method of using a polycationic polymeric antimicrobial surfactant comprising mixing a hydrophilic or a hydrophobic compound with the polycationic polymeric antimicrobial surfactant in a carrier liquid to form a stable dispersion.
32. A method according to paragraph 31, wherein the polycationic polymeric antimicrobial surfactant is a compound of any of paragraphs 1-13.
33. A method according to paragraph 31, wherein the stable dispersion specified in paragraph 31 is a dispersion as set forth in any of paragraphs 14-30.
34. A method of making a suspension or a colloid comprising incorporating a compound of any of paragraphs 1-13 into a first stable suspension or a first stable colloid containing a second surfactant to form a second stable suspension or a second stable colloid.
35. A method according to paragraph 34 wherein the first stable suspension or the first stable colloid is a stable dispersion of droplets or particulate of a compound selected from Table 2.
36. A method according to paragraph 34 or paragraph 35, wherein the second surfactant comprises a surfactant selected from Table 3 above.
37. A method of creating a dispersion, wherein the method comprises dispersing an insoluble compound in a continuous phase with a polycationic polymeric antimicrobial surfactant, wherein the polycationic polymeric antimicrobial surfactant comprises a polymer having a number of nonionic hydrophilic monomers and a number of cationic antimicrobial monomers, each comprising a vinyl pyridine quaternized with an alkyl group, and wherein the surfactant has a sufficient number of the nonionic hydrophilic monomers present in the polymer to provide a hydrophilic domain, a sufficient number of the cationic antimicrobial monomers and vinylic groups from the nonionic hydrophilic monomers present in the polymer to provide a hydrophobic domain, and the number of the cationic antimicrobial monomers present is sufficient to provide at least three cations in the polymer.

38. A method according to paragraph 37, wherein the nonionic hydrophilic monomer renders the surfactant biocompatible.
39. A method according to paragraph 37 or paragraph 38, wherein the nonionic hydrophilic monomer comprises at least one of HEMA, PEGMA, and PEGMEMA.
40. A method according to, any of paragraphs 37-39, wherein the vinyl pyridine comprises 4-vinyl pyridine.
41. A method according to paragraph 40, wherein the alkyl group has from 4 to 12 carbon atoms.
42. A method according to paragraph 41, wherein the alkyl group has from 5 to 10 carbon atoms.
43. A method according to paragraph 42, wherein the alkyl group has from 6 to 8 carbon atoms.
44. A method according to any of paragraphs 37-43, wherein the alkyl group is a linear alkyl group.
45. A method according to any of paragraphs 37-44, wherein the polymer consists essentially of the nonionic hydrophilic monomer and the cationic antimicrobial monomer.
46. A dispersion comprising a polycationic polymeric antimicrobial surfactant, a continuous liquid phase, and particles of a second polymer associated with the polycationic polymeric antimicrobial surfactant, wherein the dispersion comprises a suspension or a colloid and wherein the polycationic polymeric antimicrobial surfactant comprises a polymer having a nonionic hydrophilic monomer and a cationic antimicrobial monomer comprising a vinyl pyridine quaternized with an alkyl group and having a sufficient number of nonionic hydrophilic monomers present in the polymer to provide a hydrophilic domain, a sufficient number of cationic antimicrobial monomers and vinylic groups from nonionic hydrophilic monomers present in the polymer to provide a hydrophobic domain, and the number of cationic monomers present is sufficient to provide at least three cations in the polymer.
47. A dispersion according to paragraph 46, wherein the particles of the second polymer comprise a binder polymer of a coating.
48. A dispersion according to paragraph 46 or paragraph 47, wherein the dispersion is a latex or an emulsion.
49. A dispersion according to any of paragraphs 46-48, wherein the continuous liquid phase is aqueous.
50. A dispersion according to any of paragraphs 46-48, wherein the continuous liquid phase is an oil.
51. A dispersion according to paragraph 50, wherein the dispersion comprises an aqueous phase.
52. A dispersion according to paragraph 49, wherein the dispersion comprises an oil phase.
53. A dispersion according to any of paragraphs 46-52, wherein the dispersion further comprises a second surfactant different from the polycationic polymeric antimicrobial surfactant.
54. A dispersion according to any of paragraphs 46-52, wherein the dispersion contains no other surfactant besides the polycationic polymeric antimicrobial surfactant.

The phrases "significantly reducing the growth of" microorganisms such as bacteria and/or viruses and "significantly reducing growth" are used interchangeably to denote one or more of the following conditions, including (i) a condition in which the metabolic, activity of at least 50% of the microorganisms of a particular type exposed to a treated medium is terminated or reduced compared to microorganisms of that particular type exposed to an untreated medium over a fixed period of time; a condition where there is 50% or less of one or more types of microorganism present in and/or on a treated medium compared to the number of microorganisms exposed to an untreated medium; and/or (iii) a condition resulting when one or more types of microorganisms adhere 50% less to a treated medium compared to an untreated medium. The degree of growth reduction with respective to conditions (i)-(iii) may range from 50% to greater 99.9%.

The term "biocompatible" refers to a material that is substantially non-toxic in the in vivo environment of its intended use, and that is not substantially rejected by the patient's physiological system (i.e., is non-antigenic). This can be gauged by the ability of a material to pass the biocompatibility tests set forth in International Standards Organization (ISO) Standard No. 10993 and/or the U.S. Pharmacopeia (USP) 23 and/or the U.S. Food and Drug Administration (FDA) blue book memorandum No. G95-1, entitled "Use of international Standard ISO-10993, Biological Evaluation of Medical Devices Part-1: Evaluation and Testing." Typically, these tests measure a material's toxicity, infectivity, pyrogenicity, irritation potential, reactivity, hemolytic activity, carcinogenicity and/or immunogenicity. A biocompatible structure or material, when introduced into a majority of patients, will not cause a significantly adverse, long-lived or escalating biological reaction or response, and is distinguished from a mild, transient inflammation which typically accompanies surgery or implantation of foreign objects into a living organism.

The term "stable dispersion" refers to a dispersion such as a suspension or colloid (e.g. a latex or emulsion) that has a shelf life of at least seven days, as measured by light scattering instruments or other instruments employed for the particular classification of suspension or colloid formulated (e.g. paint, cosmetic, coating, wax, adhesive, or other end-use as discussed above). Preferably the shelf life is at least one month, more preferably at least three months, and more preferably still at least six months and at least a year, respectively.

All publications listed herein are incorporated by reference for all that they teach, as if put forth in full below.

What is claimed is:
1. A dispersion comprising
an emulsion in a continuous liquid phase, wherein the emulsion consists essentially of
a polycationic polymeric antimicrobial surfactant, and
particles of a second polymer associated with the polycationic polymeric antimicrobial surfactant,
wherein the polycationic polymeric antimicrobial surfactant comprises a polymer consisting essentially of
a nonionic hydrophilic monomer and
a cationic antimicrobial monomer comprising a vinyl pyridine quaternized with an alkyl group
and having
a sufficient number of nonionic hydrophilic monomers present in the polymer to provide a hydrophilic domain,
a sufficient number of cationic antimicrobial monomers and vinylic groups from nonionic hydrophilic monomers present in the polymer to provide a hydrophobic domain, and the number of cationic antimicrobial monomers present is sufficient to provide at least three cations in the polymer, and wherein the nonionic hydrophilic monomer comprises at least one of poly(ethylene glycol) methacrylate (poly(ethyleneglycol methacrylate)) and poly(ethylene glycol) methyl ether methacrylate (poly(ethyleneglycol methylether methacrylate)), and the vinyl pyridine comprises 4-vinyl pyridine.

2. A dispersion according to claim 1, wherein the alkyl group has from 4 to 12 carbon atoms.

3. A dispersion according to claim 2, wherein the alkyl group has from 5 to 10 carbon atoms.

4. A dispersion according to claim 2, wherein the alkyl group has from 6 to 8 carbon atoms.

5. A dispersion according to claim 2, wherein the alkyl group is a linear alkyl group.

6. A dispersion according to claim 2, wherein the particles of the second polymer comprise a binder polymer of a coating.

7. A dispersion according to claim 6, wherein the emulsion has a continuous liquid phase that is aqueous.

8. A dispersion according to claim 7, wherein the emulsion has a disperse oil phase.

9. A dispersion according to claim 8, wherein the alkyl group is a linear alkyl group.

10. A dispersion according to claim 9, wherein the alkyl group has from 6 to 8 carbon atoms.

11. A dispersion according to claim 10, wherein the dispersion further comprises at least one selected from the group consisting of a pigment and a dye.

12. A dispersion according to claim 10, wherein the dispersion further comprises a second surfactant different from the polycationic polymeric antimicrobial surfactant.

13. A dispersion according to claim 12, wherein the second surfactant is a cationic surfactant different from the polycationic polymeric antimicrobial surfactant.

14. A dispersion according to claim 12, wherein the second surfactant is one having the property of stabilizing the binder polymer.

15. A dispersion according to claim 14, wherein the dispersion further comprises at least one selected from the group consisting of a pigment and a dye.

16. A dispersion according to claim 1, wherein the dispersion further comprises a second surfactant different from the polycationic polymeric antimicrobial surfactant.

17. A dispersion according to claim 1, wherein the dispersion contains no other surfactant besides the polycationic polymeric antimicrobial surfactant.

18. A dispersion according to claim 2, wherein the emulsion has a continuous liquid phase that is an oil.

19. A dispersion according to claim 18, wherein the emulsion has a disperse aqueous phase.

20. A dispersion according to claim 1, wherein the emulsion consists of said polycationic polymeric antimicrobial surfactant and said particles of the second polymer.

21. A dispersion according to claim 1, wherein the polycationic polymeric antimicrobial surfactant consists of said nonionic hydrophilic monomer and said cationic antimicrobial monomer.

22. A dispersion according to claim 20, wherein the polycationic polymeric antimicrobial surfactant consists of said nonionic hydrophilic monomer and said cationic antimicrobial monomer.

* * * * *